United States Patent
Matsuzawa

(10) Patent No.: US 11,113,515 B2
(45) Date of Patent: Sep. 7, 2021

(54) INFORMATION PROCESSING DEVICE AND INFORMATION PROCESSING METHOD

(71) Applicant: SONY CORPORATION, Tokyo (JP)

(72) Inventor: Sota Matsuzawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 298 days.

(21) Appl. No.: 16/099,498

(22) PCT Filed: Feb. 24, 2017

(86) PCT No.: PCT/JP2017/007145
§ 371 (c)(1),
(2) Date: Nov. 7, 2018

(87) PCT Pub. No.: WO2017/199518
PCT Pub. Date: Nov. 23, 2017

(65) Prior Publication Data
US 2019/0108391 A1    Apr. 11, 2019

(30) Foreign Application Priority Data

May 17, 2016 (JP) .............................. JP2016-098741

(51) Int. Cl.
*G01P 15/00* (2006.01)
*G06K 9/00* (2006.01)
(Continued)

(52) U.S. Cl.
CPC ...... *G06K 9/00342* (2013.01); *A63B 24/0003* (2013.01); *G01P 15/00* (2013.01);
(Continued)

(58) Field of Classification Search
CPC .......... G06K 9/00342; G06K 9/00348; G06K 9/00355; G06K 9/6215; G06K 9/00805;
(Continued)

(56) References Cited

U.S. PATENT DOCUMENTS 10,049,595 B1 *  8/2018  Chuang ................. G06T 7/0012
2002/0082809 A1 * 6/2002  Kanevsky .............. G06Q 10/06
                                                                702/188
(Continued)

FOREIGN PATENT DOCUMENTS

CN      103100193 A  *  5/2013  ........... G06F 3/0304
CN      104056441 A      9/2014
(Continued)

OTHER PUBLICATIONS

Machine translation of CN-103100193 (Year: 2013).*
(Continued)

*Primary Examiner* — Natalie Huls
*Assistant Examiner* — Michael J Singletary
(74) *Attorney, Agent, or Firm* — Chip Law Group

(57) ABSTRACT

Provided is an information processing device including a sensor control unit that acquires distance measuring sensor data detected by a plurality of distance measuring sensors and a data processing unit that obtains action recognition results of one or a plurality of users by analyzing the distance measuring sensor data. The information processing device further includes an output control unit that controls output based on the action recognition result.

18 Claims, 29 Drawing Sheets

(51) Int. Cl.
*A63B 24/00* (2006.01)
*G06K 9/62* (2006.01)

(52) U.S. Cl.
CPC ..... *G06K 9/00348* (2013.01); *G06K 9/00355* (2013.01); *G06K 9/6215* (2013.01)

(58) Field of Classification Search
CPC ............ G06K 9/00369; A63B 24/0003; A63B 2024/0071; A63B 2220/20; A63B 24/0062; G01P 15/00
See application file for complete search history.

(56) References Cited

U.S. PATENT DOCUMENTS

| | | | |
|---|---|---|---|
| 2011/0304497 | A1* | 12/2011 | Molyneux .......... G06K 9/00342 342/42 |
| 2014/0028539 | A1* | 1/2014 | Newham ............... G06F 1/1698 345/156 |
| 2014/0257743 | A1 | 9/2014 | Lokshin et al. |
| 2014/0257744 | A1 | 9/2014 | Lokshin et al. |
| 2014/0288874 | A1 | 9/2014 | Matsunaga et al. |
| 2015/0335949 | A1 | 11/2015 | Lokshin et al. |
| 2015/0340066 | A1 | 11/2015 | Lokshin et al. |
| 2016/0256082 | A1* | 9/2016 | Ely ...................... A61B 5/0015 |
| 2018/0160943 | A1* | 6/2018 | Fyfe .................. A61B 5/14542 |

FOREIGN PATENT DOCUMENTS

| | | |
|---|---|---|
| CN | 204121706 U | 1/2015 |
| CN | 105144194 A | 12/2015 |
| CN | 105144246 A | 12/2015 |
| EP | 2782046 A2 | 9/2014 |
| EP | 2965240 A1 | 1/2016 |
| EP | 2965292 A1 | 1/2016 |
| JP | 2005-224318 A | 8/2005 |
| JP | 2005-293505 A | 10/2005 |
| JP | 2013-011979 A | 1/2013 |
| JP | 2013-156226 A | 8/2013 |
| JP | 2014-183931 A | 10/2014 |
| JP | 2014-188146 A | 10/2014 |
| JP | 2016-516456 A | 6/2016 |
| JP | 2016-518862 A | 6/2016 |
| KR | 10-2015-0128884 A | 11/2015 |
| KR | 10-2015-0128886 A | 11/2015 |
| WO | 2014/137386 A1 | 9/2014 |
| WO | 2014/137387 A1 | 9/2014 |
| WO | 2015/170703 A1 | 11/2015 |
| WO | 2016/053522 A1 | 4/2016 |

OTHER PUBLICATIONS

International Search Report and Written Opinion of PCT Application No. PCT/JP2017/007145, dated Apr. 11, 2017, 16 pages of ISRWO.

* cited by examiner

FIG. 3A

| ACTION | FEATURES OF DISTANCE MEASURING SENSOR DATA |
|---|---|
| STANDING | DISTANCE BETWEEN WAIST AND FOOT IS CONSTANT |
| SITTING | THERE IS NO LARGE MOTION IN STATE WHERE DISTANCE BETWEEN WAIST AND FOOT IS SHORTER THAN DISTANCE DURING STANDING |
| WALKING | APPROACH AND RECEDING BETWEEN WRIST AND WAIST ARE REPEATED AT FIXED TIME INTERVALS, AND SAME APPLIES TO DISTANCE BETWEEN BOTH FEET |
| RUNNING | SAME CHANGES OCCUR AS DURING WALKING, BUT TEMPO OF CROSSING IS FASTER THAN DURING WALKING |
| STAIR-CLIMBING | SAME CHANGES OCCUR AS DURING WALKING, BUT SHORTEST DISTANCE BETWEEN FOOT AND WAIST AND SHORTEST DISTANCE BETWEEN FOOT AND WRIST ARE SHORTER THAN DURING WALKING |
| ACTION VARYING DEPENDING ON DIRECTION OF ARM (CASE OF HOLDING ON TO STRAP IN TRAIN, CASE OF HOLDING ON TO RAILING, ETC.) | ARM IS RAISED IN CASE WHERE FOOT OR WAIST AND WRIST ARE DISTANT FROM EACH OTHER, AND ARM IS LOWERED IN CASE WHERE WAIST AND WRIST ARE CLOSE TO EACH OTHER |
| ACTION ACCOMPANIED BY RAISING AND LOWERING OF ARM (DISHWASHING, TOOTHBRUSHING, ETC.) | DISTANCE BETWEEN WAIST AND WRIST AND CYCLE OF CHANGE IN DISTANCE VARY DEPENDING ON ACTION |

FIG. 10

| MOVING DIRECTION | RIGHT WRIST-TIPTOE OF LEFT FOOT | RIGHT WRIST-TIPTOE OF RIGHT FOOT | LEFT WRIST-TIPTOE OF LEFT FOOT | LEFT WRIST-TIPTOE OF RIGHT FOOT | TRICK NAME | DESCRIPTION OF TRICK |
|---|---|---|---|---|---|---|
| FRONT LEFT | 30cm | 30cm | — | — | INDY | GRAB TOE EDGE (FRONT OF BOARD) BETWEEN BOTH FEET WITH HAND ON TAIL (REAR) SIDE |
| FRONT LEFT | 40cm | 40cm | — | — | STALEFISH | GRAB HEEL EDGE (REAR OF BOARD) BETWEEN BOTH FEET WITH HAND ON TAIL (REAR) SIDE |
| FRONT LEFT | — | — | 30cm | 30cm | MUTE | GRAB TOE EDGE (FRONT OF BOARD) BETWEEN BOTH FEET WITH HAND ON NOSE (FRONT) SIDE |
| FRONT LEFT | — | — | 40cm | 40cm | MELANCHOLY | GRAB HEEL EDGE (REAR OF BOARD) BETWEEN BOTH FEET WITH HAND ON NOSE (FRONT) SIDE |
| FRONT LEFT | 110cm | 50cm | — | — | TAIL GRAB | GRAB REAR TIP (TAIL) OF PLATE WITH HAND ON TAIL (REAR) SIDE |
| FRONT LEFT | — | — | 50cm | 110cm | NOSE GRAB | GRAB FRONT TIP (NOSE) OF PLATE WITH HAND ON NOSE (FRONT) SIDE |
| FRONT LEFT | 50cm | 110cm | 50cm | 110cm | ROCKET | GRAB NOSE WITH BOTH HANDS |

FIG. 14

| DISTANCE BETWEEN WAIST AND KICKING FOOT | | DETERMINATION USING INERTIAL SENSOR DATA | | DETERMINATION OF PERFORMANCE |
|---|---|---|---|---|
| BEGINNING OF KICKING | END OF KICKING | IMPACT DURING KICKING | TYPE OF KICKING | |
| SHORT | SHORT | LARGE | INSTEP | ◎ |
| SHORT | LONG | MEDIUM | INSTEP | ○ |
| LONG | LONG | SMALL | INSTEP | × |
| LONG | LONG | MEDIUM | INFRONT | △ |
| SHORT | LONG | MEDIUM | INFRONT | ○ |

FIG. 23

| INERTIAL SENSOR | PROXIMITY SENSOR (BLE ETC.) | DISTANCE MEASURING SENSOR | |
|---|---|---|---|
| RECOGNIZE WALKING FROM PERIODIC VIBRATION OF 1 Hz TO 4 Hz | DETERMINE FROM RSSI THAT THREE PERSONS ARE NEARBY | DETERMINE THAT DISTANCE BETWEEN SENSORS ON WRISTS IS WITHIN 20 cm | THREE PERSONS ARE WALKING HAND IN HAND |
| RECOGNIZE RUNNING FROM PERIODIC VIBRATION OF EQUAL TO OR HIGHER THAN 4 Hz | DETERMINE FROM RSSI THAT TWO PERSONS ARE NEARBY | DETERMINE THAT DISTANCE BETWEEN SENSORS ON WRISTS IS WITHIN 50 cm | TWO PERSONS ARE RUNNING IN PARALLEL |
| DETECT VIBRATION HAVING AMPLITUDE WHICH IS LARGE IN UP-DOWN DIRECTION WITH THUMBS FACING VERTICALLY UPWARD | DETERMINE FROM RSSI THAT TWO PERSONS ARE NEARBY | DETERMINE THAT DISTANCE BETWEEN SENSORS ON WRISTS IS WITHIN 20 cm | TWO PERSONS ARE SHAKING HANDS |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/007145 filed on Feb. 24, 2017, which claims priority benefit of Japanese Patent Application No. JP 2016-098741 filed in the Japan Patent Office on May 17, 2016. Each of the above-referenced applications is hereby incorporated herein by reference in its entirety.

TECHNICAL FIELD

The present disclosure relates to an information processing device, an information processing method, and a program.

BACKGROUND ART

In recent years, various techniques have been known as techniques for recognizing user's actions. For example, a technique for recognizing a motion of a foot on the basis of a detection result obtained using a walking sensor attached to a user's shoe is disclosed (see, for example, Patent Literature 1). In addition, techniques for recognizing user's actions not limited to motions of feet are known.

For example, there is a technique for recognizing a user's action on the basis of a detection result obtained using an inertial sensor (for example, an acceleration sensor, a gyroscope sensor, or the like). In such a technique, an object to be detected using the inertial sensor is a motion itself generated in association with the user's action, and the user's action is recognized on the basis of the user's motion detected by the inertial sensor.

CITATION LIST

Patent Literature

Patent Literature 1 JP 2005-293505A

DISCLOSURE OF INVENTION

Technical Problem

However, it is desirable to provide a technique capable of improving the accuracy of recognition of a user's action.

Solution to Problem

According to the present disclosure, there is provided an information processing device including: a sensor control unit configured to acquire distance measuring sensor data detected by a plurality of distance measuring sensors; a data processing unit configured to obtain action recognition results of one or a plurality of users by analyzing the distance measuring sensor data; and an output control unit configured to control output according to the action recognition result.

According to the present disclosure, there is provided an information processing method including: a sensor control unit configured to acquire distance measuring sensor data detected by a plurality of distance measuring sensors; a data processing unit configured to obtain action recognition results of one or a plurality of users by analyzing the distance measuring sensor data; and an output control unit configured to control output according to the action recognition result by a processor.

According to the present disclosure, there is provided a program causing a computer to function as an information processing device including: a sensor control unit configured to acquire distance measuring sensor data detected by a plurality of distance measuring sensors; a data processing unit configured to obtain action recognition results of one or a plurality of users by analyzing the distance measuring sensor data; and an output control unit configured to control output according to the action recognition result.

Advantageous Effects of Invention

As described above, according to the present disclosure, a technique capable of improving the accuracy of recognition of a user's action is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3A is a diagram illustrating an example of information in which a user's actions are associated with features of distance measuring sensor data detected when the actions are performed.

FIG. 10 is a diagram illustrating examples of determination of trick names.

FIG. 14 is a diagram illustrating an example of a kick performance determination table.

FIG. 23 is a diagram illustrating an example of a determination table of actions related to an interaction between a plurality of users.

MODE(S) FOR CARRYING OUT THE INVENTION

Figure 1A:
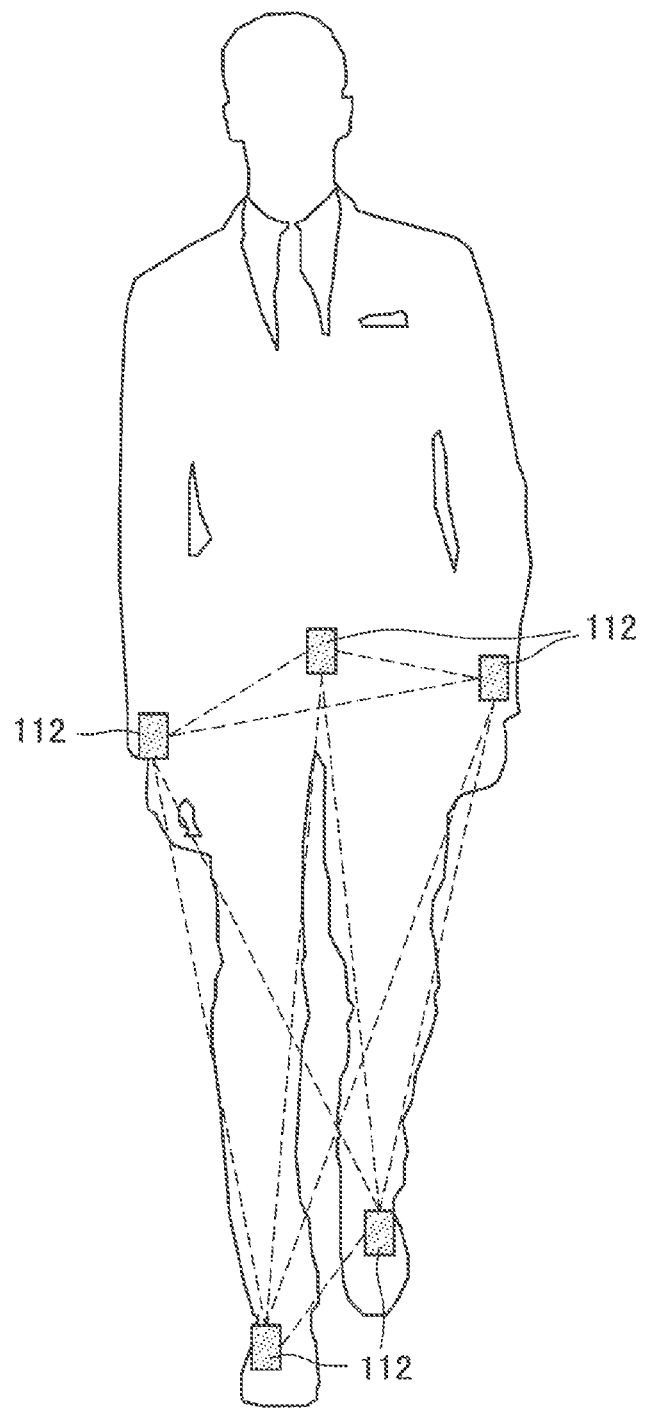
FIG. 1A is a diagram illustrating an outline of a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in the present specification and the drawings, structural elements that have substantially the same function and structure are sometimes distinguished from each other using different numbers after the same reference sign. However, when there is no need in particular to distinguish structural elements that have substantially the same function and structure, the same reference sign alone is attached. Further, there are cases in which similar structural elements of different embodiments are distinguished by adding the same reference numeral followed by different letters. However, in a case where it is not necessary to particularly distinguish each of similar structural element, only the same reference signs are attached.

Note that a description will be given in the following order.

0. Background
1. First Embodiment (Distance Measuring Sensor)
1.1. Outline
1.2. Functional Configuration Example
1.3. Action Recognition Using Distance Measuring Sensor
2. Second Embodiment (Distance Measuring Sensor+Inertial Sensor)
2.1. Functional Configuration Example
2.2. Recognition of Step Size
2.3. Determination of Tricks of Snowboarding
2.4. Determination of Performance of Golf Swing
3. Third Embodiment (Distance Measuring Sensor+Inertial Sensor+Proximity Sensor)
3.1. Functional Configuration Example
3.2. Action Recognition Related to Interaction
4. Hardware Configuration Example
5. Conclusion 0. Background First, the background of an embodiment of the present disclosure will be described. In recent years, various techniques have been known as techniques for recognizing users' actions. For example, a technique for recognizing a motion of a foot on the basis of a detection result obtained using a walking sensor attached to a user's shoe is disclosed (see, for example, JP 2005-293505A). In addition, techniques for recognizing users' actions not limited to motions of feet are known.

For example, there is a technique for recognizing a user's action on the basis of a detection result obtained using an inertial sensor (for example, an acceleration sensor, a gyroscope sensor, or the like). In such a technique, an object to be detected using the inertial sensor is a motion itself generated in association with the user's action, and the user's action is recognized on the basis of the user's motion detected by the inertial sensor.

However, the inertial sensor has characteristics such as drift and offset, and thus the accuracy of action recognition deteriorates due to these characteristics. Particularly, micro electro mechanical systems (MEMS) sensors for consumer use individually differ greatly in characteristics such as drift and offset, and thus it may be necessary to perform the recognition of a user's action in consideration of the influence of these characteristics.

Consequently, in this specification, a technique capable of improving the accuracy of recognition of a user's action is mainly proposed. Specifically, the user's action is recognized on the basis of detection results obtained by distance measuring sensors (distances between the plurality of distance measuring sensors). With such a configuration, it is possible to improve the accuracy of recognition of a user's action which has been difficult to improve using only a detection result obtained by an inertial sensor.

The background of the embodiment of the present disclosure has been described above.

1. First Embodiment (Distance Measuring Sensor)

Subsequently, a first embodiment of the present disclosure will be described. In the first embodiment of the present disclosure, a description will be given of a case where distance measuring sensor data detected by a distance measuring sensor is used in order to recognize a user's action.

1.1. Outline

Figure 1B:
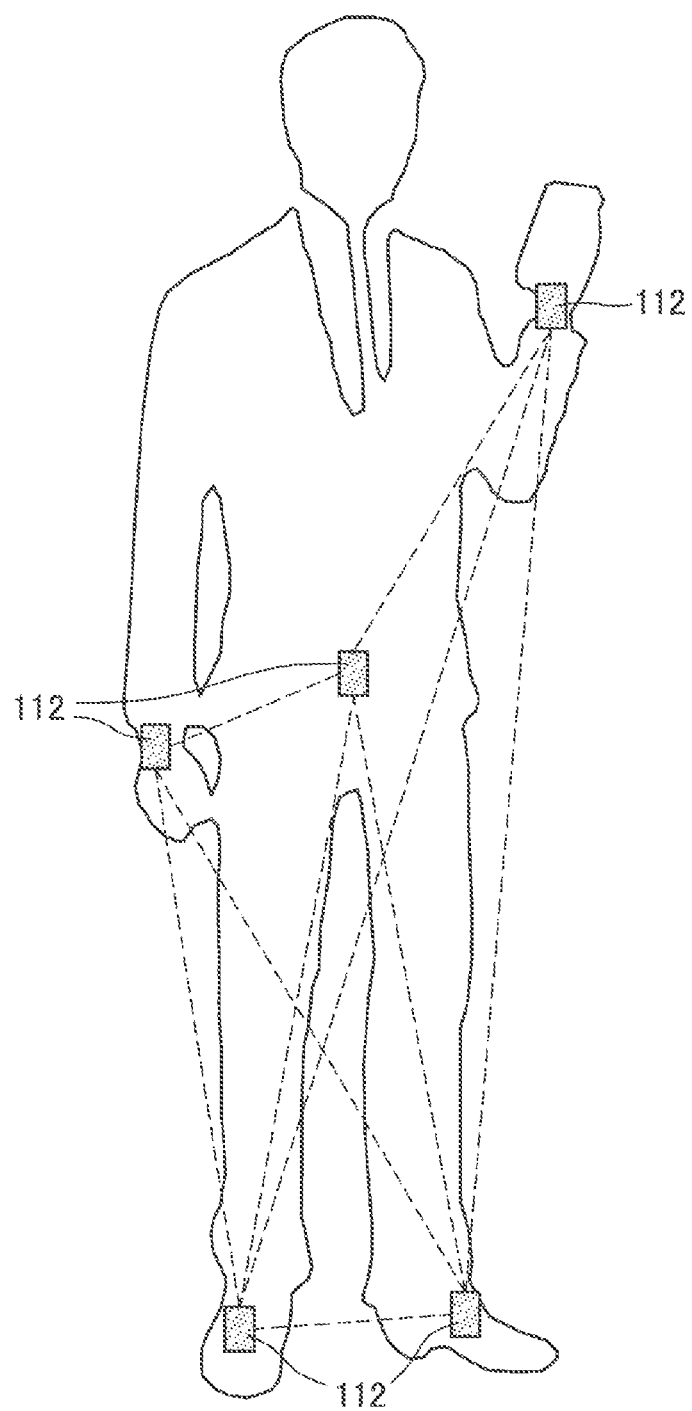
FIG. 1B is a diagram illustrating an outline of the first embodiment of the present disclosure.
Figure 1C:
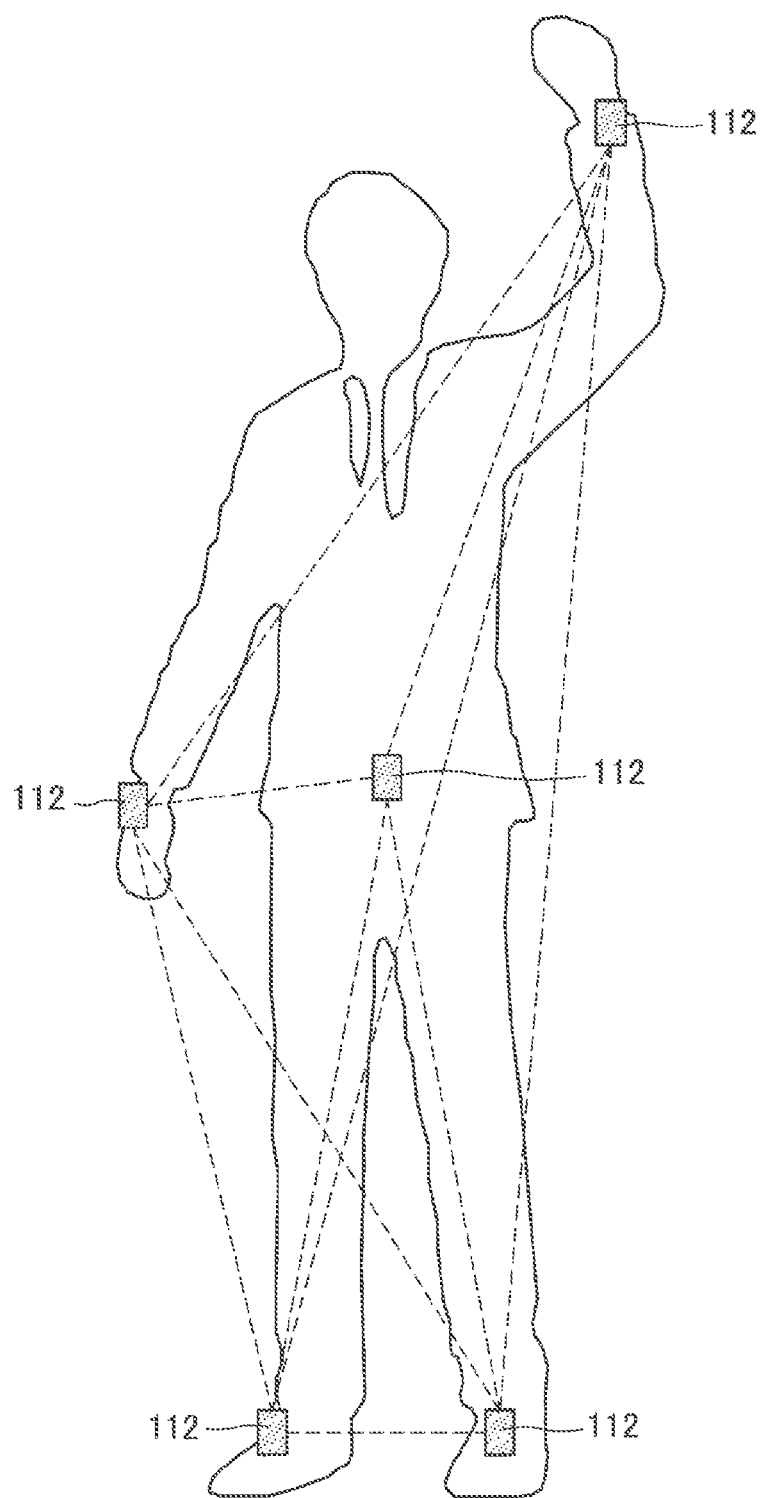
FIG. 1C is a diagram illustrating an outline of the first embodiment of the present disclosure.

First, an outline of the first embodiment of the present disclosure will be described. FIGS. 1A, 1B, and 1C are diagrams illustrating the outline of the first embodiment of the present disclosure. In the first embodiment of the present disclosure, a plurality of distance measuring sensors 112 are used as illustrated in FIGS. 1A, 1B, and 1C. Each of the plurality of distance measuring sensors 112 includes a transmitter and a receiver. The transmitter transmits a signal, and the receiver receives a signal from another distance measuring sensor 112. In this case, each of the plurality of distance measuring sensors 112 can measure a distance from another distance measuring sensor 112 on the basis of the signal received from the other distance measuring sensor 112.

In this specification, a case is mainly assumed in which a signal to be transmitted from the transmitter to the receiver is based on an ultra wideband (UWB), but the type of signal is not particularly limited. For example, the type of signal to be transmitted from the transmitter to the receiver may be light, sound waves, or radio waves. A method of measuring a distance is not particularly limited either. For example, each of the plurality of distance measuring sensors 112 may measure a distance from another distance measuring sensor 112 on the basis of a time for which a signal propagates, or may measure a distance from another distance measuring sensor 112 on the basis of the intensity of a received signal.

In the first embodiment of the present disclosure, a case is assumed in which the plurality of distance measuring sensors 112 are attached to one user, as illustrated in FIGS. 1A, 1B, and 1C. However, as will be described later, all of the plurality of distance measuring sensors 112 do not need to be attached to one user. For example, the plurality of distance measuring sensors 112 may be dispersively attached to a plurality of users. Alternatively, the plurality of distance measuring sensors 112 may be dispersively attached to a user and an object related to the user's action.

In the example illustrated in FIGS. 1A, 1B, and 1C, five distance measuring sensors 112 are attached to the user's waist, right wrist, left wrist, right foot, and left foot. The accuracy of action recognition is improved as the number of distance measuring sensors 112 increases, but the number of distance measuring sensors is not particularly limited as long as the number is two or more. In addition, the attachment position of each of the plurality of distance measuring sensors 112 is not particularly limited either. As indicated by solid lines in FIGS. 1A, 1B, and 1C, a distance between two distance measuring sensors 112 of any combination selected from among the plurality of distance measuring sensors 112 may be measured.

Note that it is assumed that the distances between parts of individual users' bodies differ. Consequently, the attachment position of each of the plurality of distance measuring sensors 112 may be determined by performing calibration for the individual user in advance. Thus, it is possible to more accurately attach each of the plurality of distance measuring sensors 112, and the accuracy of action recognition based on the distance measuring sensor data is also expected to improve.

In addition, attachment position information may be added to a signal transmitted from each of the plurality of distance measuring sensors 112. Thus, in the other distance measuring sensors 112, it is possible to identify where the distance measuring sensor 112 from which a received signal has been transmitted is attached. That is, in the other distance measuring sensors 112, it is possible to identify the attachment position of the distance measuring sensor 112 corresponding to a distance to be measured on the basis of the received signal.

The attachment position information transmitted by the distance measuring sensor 112 may be determined in advance. In this case, the distance measuring sensor 112 may be attached to the corresponding mounting target in advance. For example, when the distance measuring sensor 112 to be attached to a hand is attached to a glove in advance, the distance measuring sensor 112 to be attached to the hand is attached to the user's hand by the user wearing the glove.

Similarly, when the distance measuring sensor 112 to be attached to a foot is attached to a shoe in advance, the distance measuring sensor 112 to be attached to the shoe is attached to the user's foot when the user puts on the shoe. In addition, when the distance measuring sensor 112 to be attached to the waist is attached to a belt in advance, the distance measuring sensor 112 to be attached to the belt is attached to the user's waist when the user puts on the belt.

Alternatively, the attachment position information transmitted by the distance measuring sensor 112 may be determined at the time of using the attachment position information. In this case, the distance measuring sensor 112 may automatically recognize the attachment position thereof using any method. For example, in a case where there is a subsidiary device corresponding to the attachment position at the attachment position, the distance measuring sensor 112 can ascertain the attachment position by recognizing the subsidiary device and can transmit the attachment position information.

Alternatively, it is also possible to cause each of the plurality of distance measuring sensors 112 to learn signals to be received from the other distance measuring sensors 112 for each attachment position. Thereby, each of the plurality of distance measuring sensors 112 can recognize the attachment position on the basis of collation between the signals to be received from the other distance measuring sensors 112 and learning results.

Alternatively, in a case where an inertial sensor corresponding to each of the plurality of distance measuring sensors 112 is attached, inertial sensor data can be learned for each attachment position. For example, in a case where the distance measuring sensor 112 and the inertial sensor are in one device, the distance measuring sensor 112 and the inertial sensor in the device correspond to each other. Thereby, each of the plurality of distance measuring sensors 112 can recognize the attachment position on the basis of collation between the corresponding inertial sensor data and a learning result.

Alternatively, it may be possible to register the attachment position information in the distance measuring sensor 112 in accordance with the user's predetermined registration operation. Thus, the distance measuring sensor 112 can transmit the registered attachment position information. For example, the user may be able to register the attachment position information in the distance measuring sensor 112 through near field communication or the like, in accordance with a predetermined registration operation (for example, an operation of pressing a registration start button, or the like) which is performed on a mobile terminal (for example, a smartphone or the like).

Note that, in a case where the distance measuring sensors not required to measure a distance come into contact with each other in a way in which the user did not intend, there is a possibility of a distance between the distance measuring sensors between which a distance is not required to be measured being measured. Consequently, distance measuring sensors between which a distance is required to be measured may be paired. Thus, the measurement of a distance may be performed only between the paired distance measuring sensors.

Pairing may be completed at the time of shipment of the distance measuring sensors, but it is preferable that the pairing be performed through a predetermined pairing operation performed by the user in consideration of a case where the distance measuring sensors need to be replaced, or the like. For example, the user may perform pairing by registering identification information regarding another distance measuring sensor as a pairing partner with respect to each of the plurality of distance measuring sensors, in accordance with a pairing operation (for example, an operation of pressing a pairing start button of each of the plurality of distance measuring sensors to bring the distance measuring sensors close to each other, or the like) for each of the plurality of distance measuring sensors.

Alternatively, the user may perform pairing by registering identification information regarding another distance measuring sensor as a pairing partner with respect to each of the plurality of distance measuring sensors through near field communication or the like, in accordance with a predetermined pairing operation for a mobile terminal (for example, a smartphone or the like) (for example, an operation of pressing the pairing start button and bringing the plurality of distance measuring sensors close to a mobile terminal). Thus, it may not be necessary to attach the pairing start button to the distance measuring sensor, and the durability of the distance measuring sensor may not be deteriorated.

Alternatively, the user may be able to designate the plurality of distance measuring sensors to be paired on the Web. For example, in this case, the pairing may be performed by registering identification information regarding another distance measuring sensor as a pairing partner with respect to each of the plurality of distance measuring sensors through near field communication or the like of a mobile terminal (for example, a smartphone or the like).

In addition, as described above, a case is also assumed in which the plurality of distance measuring sensors are dispersively attached to the user and an object related to the user's action. In this case, when the distance measuring sensor attached to the user is registered in a mobile terminal (for example, a smartphone or the like) and a predetermined code given to the object is read by the mobile terminal, pairing between the distance measuring sensor attached to the object and the distance measuring sensor attached to the user may be started.

The outline of the first embodiment of the present disclosure has been described above.

1.2. Functional Configuration Example

Figure 2:
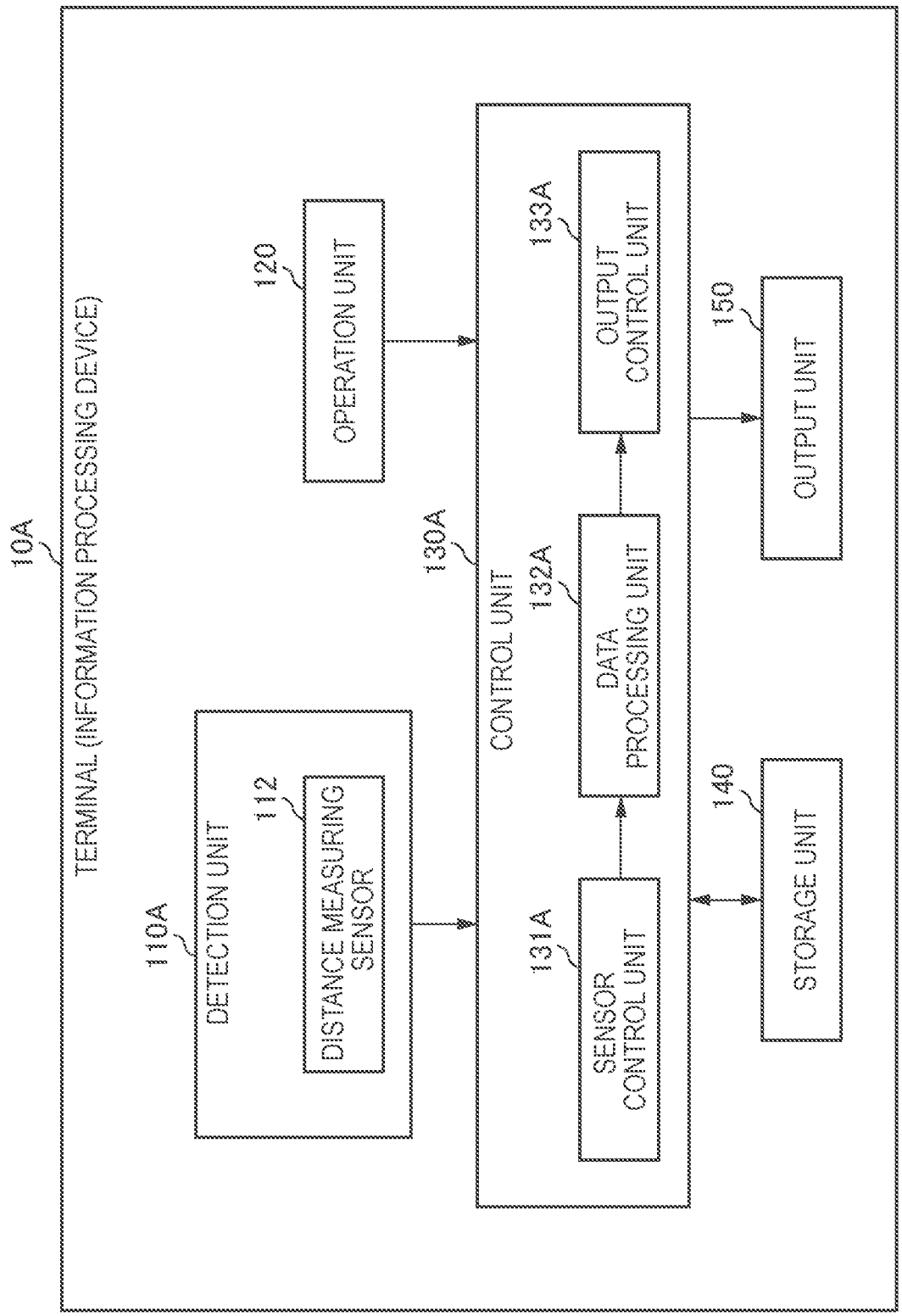
FIG. 2 is a diagram illustrating a functional configuration example of an information processing device according to the first embodiment of the present disclosure.

Subsequently, a functional configuration example of an information processing device 10A according to the first embodiment of the present disclosure will be described. FIG. 2 is a diagram illustrating the functional configuration example of the information processing device 10A. As illustrated in FIG. 2, the information processing device 10A includes a detection unit 110A, an operation unit 120, a control unit 130A, a storage unit 140, and an output unit 150.

Note that, in this specification, an example in which blocks other than the detection unit 110A (the operation unit 120, the control unit 130A, the storage unit 140, and the output unit 150) are in the same device as the detection unit 110A will be mainly described. However, the positions of the blocks other than the detection unit 110A are not particularly limited. For example, some or all of the blocks other than the detection unit 110A may be in a mobile terminal (for example, a smartphone or the like) or the like, or may be in a server or the like.

The detection unit 110A includes various sensors, and can acquire sensor data obtained by sensing of the various sensors. In the first embodiment of the present disclosure, the detection unit 110A includes the distance measuring sensor 112. Note that although one distance measuring sensor 112 is shown in the example illustrated in FIG. 2, the detection unit 110A actually includes the plurality of distance measuring sensors 112.

The operation unit 120 detects a user's operation and outputs the detected operation to the control unit 130A. For example, in a case where the operation unit 120 is constituted by a touch panel, the user's operation may be equivalent to an operation performed on the touch panel (for example, a tap operation, a drag operation, or the like). However, the operation unit 120 may be constituted by hardware other than a touch panel (for example, a button or the like). Alternatively, the operation unit 120 may be constituted by a microphone, and voice may be detected as an operation by the microphone.

The control unit 130A controls each of the units of the information processing device 10A. As illustrated in FIG. 2, the control unit 130A includes a sensor control unit 131A, a data processing unit 132A, and an output control unit 133A. These functional blocks will be described later in detail. Note that the control unit 130A may be constituted by, for example, a central processing unit (CPU) or the like. In a case where the control unit 130A is constituted by a processing device such as CPU, the processing device may be constituted by an electronic circuit.

The storage unit 140 is a recording medium that stores programs to be executed by the control unit 130A and stores data necessary for the execution of the programs. In addition, the storage unit 140 transitorily stores data to perform computation by the control unit 130A. The storage unit 140 may be a magnetic storage device, a semiconductor storage device, an optical storage device, or a magneto-optical storage device.

The output unit 150 outputs various types of information. For example, the output unit 150 includes a display unit capable of displaying information. The display unit may be a display capable of performing display which is visually recognizable by the user, and may be a projector, a liquid crystal display, or an organic electro-luminescence (EL) display.

In addition, the output unit 150 may include a sound output unit capable of outputting a sound. For example, the sound output unit includes a speaker, and outputs a sound using the speaker. The number of speakers included in the sound output unit is not particularly limited as long as the number is one or more. A position where each of one or more speakers included in the sound output unit is provided is not particularly limited either. Note that the sound output unit may include a sound output device in a form other than a speaker (for example, earphones, a headset, or the like), as long as the sound output device has a sound output function.

Note that the terms "voice" (or "speech") and "sound" are used distinctively in this specification. That is, "voice" (or "speech") includes sounds uttered by the user among sounds collected by the microphone. In addition, "voice" (or "speech") includes sounds uttered by the information processing device 10A among sounds that are output from the information processing device 10A. "Sound" includes noise and the like, in addition to the sounds uttered by the user and the sounds uttered by the information processing device 10A.

In the present embodiment, the sensor control unit 131A acquires distance measuring sensor data detected by the plurality of distance measuring sensors 112. In addition, the data processing unit 132A obtains action recognition results of one or a plurality of users by analyzing the distance measuring sensor data. The output control unit 133A controls output according to the action recognition result. According to such a configuration, it is possible to improve the accuracy of recognition of the user's action.

An output destination of the action recognition result is not particularly limited. For example, the output control unit 133A may perform control such that the action recognition result is displayed by the display unit included in the output unit 150, or may perform control such that the action recognition result is output by the sound output unit included in the output unit 150. Alternatively, the output control unit 133A may perform control such that the action recognition result is transmitted to another device (for example, a smartphone or the like) which is different from the information processing device 10A.

The output control unit 133A may control output according to the action recognition result and an ideal action determined in advance. For example, in a case where the degree of similarity between the action recognition result and the ideal action determined in advance is calculated by the data processing unit 132A, the output control unit 133A may control the output of the degree of similarity. The degree of similarity may be calculated in any way. A specific example of the output of the degree of similarity will be described later.

Here, some distances between the distance measuring sensors may be used in order to recognize the user's action. For example, a set of distances between the distance measuring sensors may be used. That is, the data processing unit 132A may calculate a first distance between a first distance measuring sensor and a second distance measuring sensor among the plurality of distance measuring sensors 112, and may obtain an action recognition result of the user on the basis of the first distance.

For example, in a case where the first distance satisfies a predetermined first condition, the data processing unit 132A may obtain an action corresponding to the first condition as the action recognition result of the user. In this case, the set of distance measuring sensors may be any distance measuring sensors among the plurality of distance measuring sensors 112.

Alternatively, two sets of distances between the distance measuring sensors may be used in order to recognize the user's action. That is, the data processing unit 132A may calculate a second distance between a third distance measuring sensor and a fourth distance measuring sensor among the plurality of distance measuring sensors 112, and may obtain an action recognition result of the user on the basis of the first distance and the second distance.

For example, in a case where the first distance satisfies a predetermined first condition and the second distance satisfies a predetermined second condition, the data processing unit 132A may obtain an action corresponding to the first condition and the second condition as the action recognition result of the user. In this case, the second set of distance measuring sensors may be any distance measuring sensors among the plurality of distance measuring sensors 112.

Alternatively, three or more sets of distances between the distance measuring sensors may be used in order to recognize the user's action. In the following ""recognition of an action which is performed by analyzing the distance measuring sensor data"," a description will be mainly given of a case where a set of distances between the distance measuring sensors are used and a case where two sets of distance measuring sensors are used.

The functional configuration example of the information processing device 10A according to the first embodiment of the present disclosure has been described above.

1.3. Action Recognition Using Distance Measuring Sensor

Subsequently, action recognition using the distance measuring sensor will be described. Attachment position information is added to a signal transmitted from each of the plurality of distance measuring sensors 112 by the above-described method. The attachment position information may include information such as a wrist, a waist, and a foot, and may not include information regarding the right or the left. In addition, it is preferable that pairing is performed between the plurality of distance measuring sensors 112 by the above-described method.

FIG. 3A is a diagram illustrating an example of information in which the user's actions are associated with features of distance measuring sensor data detected when the actions are performed. In FIG. 3A, "standing", "sitting", "walking", "running", "stair-climbing", "an action varying according to the orientation of an arm", and "an action accompanied by the raising and lowering of an arm" are described as types of actions of the user.

For example, as illustrated in FIG. 3A, in a case where the user's action is "standing", there is a feature that a distance between the waist and the foot of the user becomes constant. Therefore, the data processing unit 132A may calculate a distance between the distance measuring sensor 112 attached to the waist and the distance measuring sensor 112 attached to the right foot (or the left foot), and may obtain a recognition result indicating that the user's action is "standing" in a case where a period of time for which the calculated distance becomes constant exceeds a predetermined period of time.

Figure 3B:
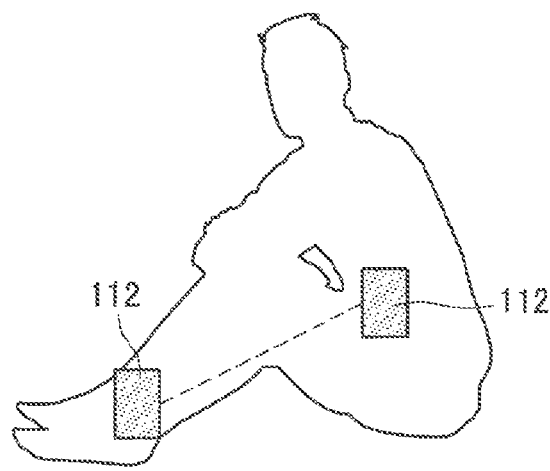
FIG. 3B is a diagram illustrating a state in a case where a user's action is sitting.

FIG. 3B is a diagram illustrating a state in a case where the user's action is "sitting". As illustrated in FIG. 3A, in a case where the user's action is "sitting", there is a feature that there is no large motion in a state where a distance between the waist and the foot of the user is shorter than the distance during standing. Therefore, the data processing unit 132A may calculate a distance between the distance measuring sensor 112 attached to the waist and the distance measuring sensor 112 attached to the right foot (or the left foot), and may obtain a recognition result indicating that the user's action is "sitting", in a case where a period of time when the calculated distance is set to be a fixed distance (or within a fixed section) shorter than the distance during standing exceeds a predetermined period of time.

Figure 3C:
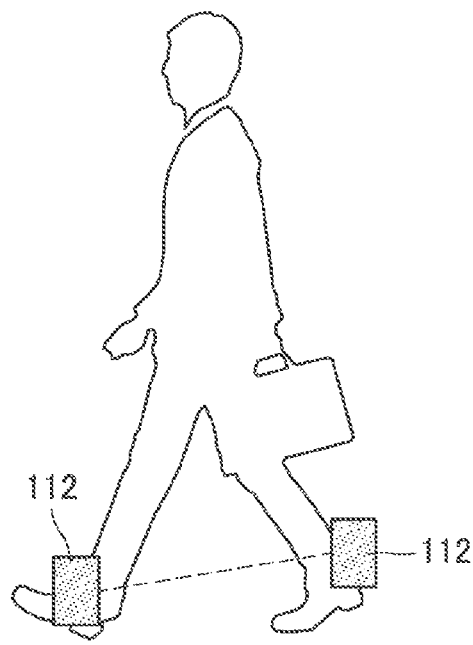
FIG. 3C is a diagram illustrating a state in a case where a user's action is walking.

FIG. 3C is a diagram illustrating a state in a case where the user's action is "walking". As illustrated in FIG. 3A, in a case where the user's action is "walking", there is a feature that approach and receding between the wrist and the waist and approach and receding between both feet are repeated at fixed time intervals.

Therefore, the data processing unit 132A may obtain a recognition result indicating that the user's action is "walking" in a case where the approach and receding between the distance measuring sensor 112 attached to the right wrist (or the left wrist) and the distance measuring sensor 112 attached to the waist are repeated a predetermined number of times at fixed time intervals, and approach and receding between the distance measuring sensor 112 attached to the right foot and the distance measuring sensor 112 attached to the left foot are repeated a predetermined number of times at fixed time intervals.

In addition, as illustrated in FIG. 3A, in a case where the user's action is "running", there is a feature that approach and receding between the wrist and the waist and approach and receding between both feet are repeated at fixed time intervals shorter than the time intervals during walking.

Therefore, the data processing unit 132A may obtain a recognition result indicating that the user's action is "running" in a case where approach and receding between the distance measuring sensor 112 attached to the right wrist (or the left wrist) and the distance measuring sensor 112 attached to the waist are repeated a predetermined number of times at fixed time intervals shorter than the time intervals during walking, and approach and receding between the distance measuring sensor 112 attached to the right foot and the distance measuring sensor 112 attached to the left foot are repeated a predetermined number of times at fixed time intervals shorter than the time intervals during walking.

Figure 3D:
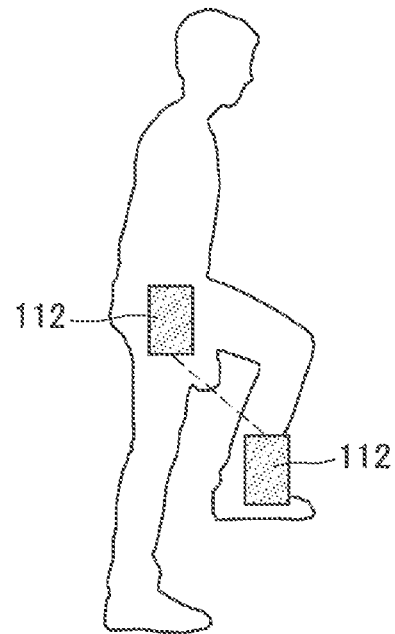
FIG. 3D is a diagram illustrating a state in a case where a user's action is stair-climbing.

FIG. 3D is a diagram illustrating a state in a case where the user's action is "stair-climbing". As illustrated in FIG. 3A, in a case where the user's action is "stair-climbing", there is a feature that approach and receding between the wrist and the waist and approach and receding between both feet are repeated at fixed time intervals, and the shortest distance between the foot and the waist and the shortest distance between the foot and the wrist are smaller than the distances during walking.

Therefore, the data processing unit 132A may obtain a recognition result indicating that the user's action is "stair-climbing" in a case where approach and receding between the distance measuring sensor 112 attached to the right wrist (or the left wrist) and the distance measuring sensor 112 attached to the waist are repeated a predetermined number of times at fixed time intervals, approach and receding between the distance measuring sensor 112 attached to the right foot and the distance measuring sensor 112 attached to the left foot are repeated a predetermined number of times at fixed time intervals, the shortest distance between the distance measuring sensor 112 attached to the right foot (or the left foot) and the distance measuring sensor 112 attached to the waist is smaller than the distance during walking, and the shortest distance between the distance measuring sensor 112 attached to the right foot (or the left foot) and the distance measuring sensor 112 attached to the right wrist (or the left wrist) is smaller than the distance during walking.

In addition, as illustrated in FIG. 3A, in a case where the user's action is "an action varying according to the orientation of an arm", there is a feature that the arm is raised when the foot or the waist and the wrist are distant from each other, and there is a feature that the arm is lowered when the waist and the wrist are close to each other. Here, as illustrated in FIG. 3A, an example of the action of raising the arm is an action of holding on to a strap in a train (or a bus). In addition, an example of the action of lowering the arm is an action of holding on to a railing.

Therefore, the data processing unit 132A may obtain a recognition result indicating that the user's action is "an action of holding on to a strap in a train (or a bus)", in a case where a distance between the distance measuring sensor 112 attached to the right foot (or the left foot) or the waist and the distance measuring sensor 112 attached to the right wrist (or the left wrist) is larger than a predetermined distance. On the other hand, the data processing unit 132A may obtain a recognition result indicating that the user's action is "an action of holding on to a railing", in a case where a distance between the distance measuring sensor 112 attached to the waist and the distance measuring sensor 112 attached to the right wrist (or the left wrist) is smaller than the predetermined distance.

Figure 3E:
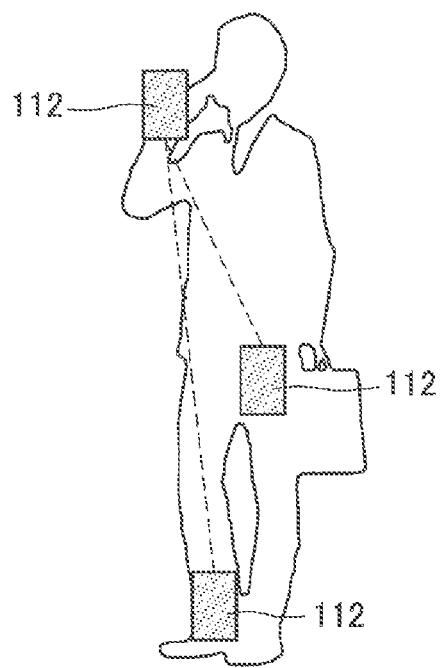
FIG. 3E is a diagram illustrating a state in a case where a user's action is an action accompanied by the raising and lowering of the user's arm.

FIG. 3E is a diagram illustrating a state in a case where the user's action is "an action accompanied by raising and lowering of an arm". As illustrated in FIG. 3A, in a case where the user's action is "an action accompanied by raising and lowering of an arm", there is a feature that a distance between the waist and the wrist and the cycle of a change in the distance vary depending on an action. For example, as illustrated in FIG. 3A, examples of "an action accompanied by raising and lowering of an arm" include dishwashing, toothbrushing, and the like. The distance between the waist and the wrist is small during dishwashing, while the distance between the waist and the wrist is large during toothbrushing.

Therefore, the data processing unit 132A may obtain a recognition result indicating that the user's action is "dishwashing", in a case where the distance measuring sensor 112 attached to the right wrist (or the left wrist) and the distance measuring sensor 112 attached to the waist vibrate at predetermined cycles in a state where a distance between the distance measuring sensors is smaller than a predetermined distance. On the other hand, the data processing unit 132A may obtain a recognition result indicating that the user's action is "toothbrushing", in a case where the distance measuring sensor 112 attached to the right wrist (or the left wrist) and the distance measuring sensor 112 attached to the waist vibrate at predetermined cycles in a state where a distance between the distance measuring sensors is larger than the predetermined distance.

Note that, in the above description, a description has been mainly given of an example in which actions corresponding to the features of the distance measuring sensor data are recognized in a case where all of the features are satisfied. However, all of the features of the distance measuring sensor data may not be satisfied. For example, in a case where some of the features of the distance measuring sensor data are satisfied, actions corresponding to the features may be recognized. An action recognition method is not limited, and actions corresponding to conditions prepared in advance may be recognized in a case where the features of the distance measuring sensor data satisfy the conditions, or actions may be recognized using machine learning such as a support vector machine (SVM), a recurrent neural network (RNN), or a hidden Markov model (HMM).

Action recognition using the distance measuring sensors has been described above.

2. Second Embodiment (Distance Measuring Sensor+Inertial Sensor)

Subsequently, a second embodiment of the present disclosure will be described. In the first embodiment of the present disclosure, a description has been given of a case where the distance measuring sensor data detected by the distance measuring sensor is used in order to recognize a user's action. In the second embodiment of the present disclosure, a description will be given of a case where not only distance measuring sensor data detected by a distance measuring sensor but also inertial sensor data detected by an inertial sensor is used in order to recognize a user's action.

2.1. Functional Configuration Example

Figure 4:
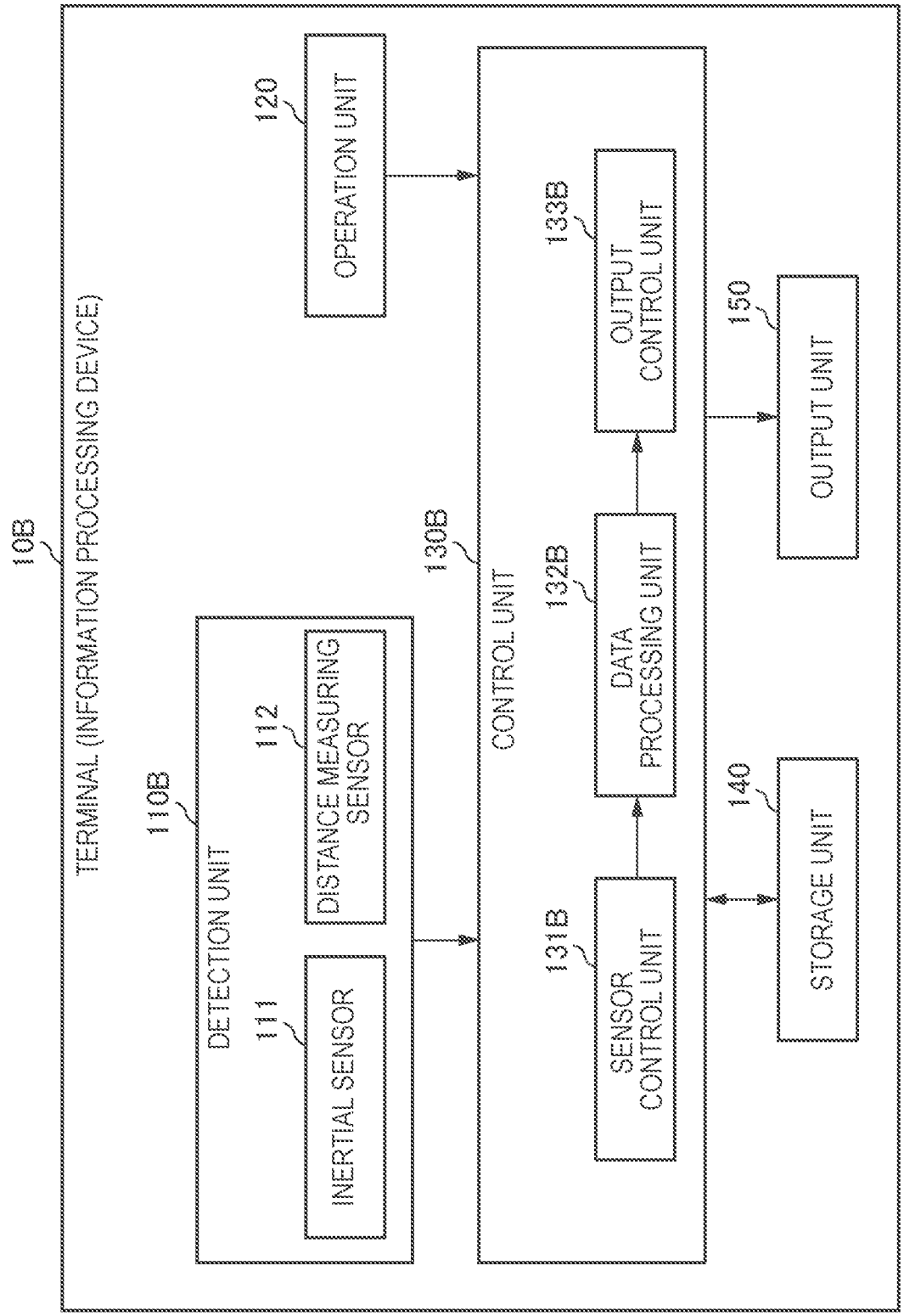
FIG. 4 is a diagram illustrating a functional configuration example of an information processing device according to a second embodiment of the present disclosure.

Subsequently, a functional configuration example of an information processing device 10B according to the second embodiment of the present disclosure will be described. FIG. 4 is a diagram illustrating the functional configuration example of the information processing device 10B according to the second embodiment of the present disclosure. As illustrated in FIG. 4, the information processing device 10B includes a detection unit 110B, an operation unit 120, a control unit 130B, a storage unit 140, and an output unit 150. Hereinafter, a description will be mainly given of functional blocks (the detection unit 110B and the control unit 130B), which are different from those of the information processing device 10A according to the first embodiment of the present disclosure, in the information processing device 10B according to the second embodiment of the present disclosure.

The detection unit 110B includes an inertial sensor 111 in addition to a distance measuring sensor 112. Note that the type of inertial sensor 111 is not particularly limited, but the inertial sensor 111 may include an acceleration sensor, a gyroscope sensor, a geomagnetic sensor, and a vibration sensor, as an example. Here, the acceleration sensor detects an acceleration, the gyroscope sensor detects an angular velocity, the geomagnetic sensor detects the direction of terrestrial magnetism, and the vibration sensor detects vibration. One inertial sensor 111 is shown in the example illustrated in FIG. 4, but the detection unit 110B actually includes one or a plurality of inertial sensors 111.

The control unit 130B controls each of the units of the information processing device 10B. As illustrated in FIG. 4, the control unit 130B includes a sensor control unit 131B, a data processing unit 132B, and an output control unit 133B. These functional blocks will be described later in detail. Note that the control unit 130B may be constituted by, for example, CPU or the like. In a case where the control unit 130B is constituted by a processing device such as CPU, the processing device may be constituted by an electronic circuit.

In the present embodiment, the sensor control unit 131B acquires distance measuring sensor data detected by a plurality of distance measuring sensors 112, and acquires inertial sensor data detected by one or a plurality of inertial sensors 111. In addition, the data processing unit 132B obtains an action recognition result of the user by analyzing the distance measuring sensor data and the inertial sensor data. The output control unit 133B controls output according to the action recognition result. According to such a configuration, it is possible to improve the accuracy of recognition of the user's action.

The control of output which is performed by the output control unit 133B may be performed in the same manner as the control of output which is performed by the output control unit 133A according to the first embodiment of the present disclosure, and thus a description of details of the function of the output control unit 133B will be omitted.

The functional configuration example of the information processing device 10B according to the second embodiment of the present disclosure has been described above.

2.2. Recognition of Step Size

In the second embodiment of the present disclosure, the data processing unit 132B can obtain an action recognition result of the user on the basis of a distance between a first distance measuring sensor and a second distance measuring sensor in a case where the inertial sensor data satisfies a predetermined condition. As a specific example, the recognition of a step size will be described. That is, the first distance measuring sensor is attached to the user's right foot, the second distance measuring sensor is attached to the user's left foot, and the data processing unit 132B can acquire a distance between the first distance measuring sensor and the second distance measuring sensor as the user's step size in a case where the inertial sensor data satisfies the predetermined condition.

During walking, the distance measuring sensor 112 is attached to the right foot and the left foot as illustrated in FIG. 3C. In this case, attachment position information is added to a signal transmitted from the distance measuring sensor 112 attached to each of the right foot and the left foot by the above-described method. The attachment position information may not include information regarding the right or the left. In addition, it is preferable that pairing is performed between the plurality of distance measuring sensors 112 by the above-described method.

The inertial sensor 111 is attached to any part of the user's body. In this example, a case is mainly assumed in which an acceleration sensor is used as the inertial sensor 111, but a gyroscope sensor, a vibration sensor, or another sensor may be used as the inertial sensor 111.

Figure 5:
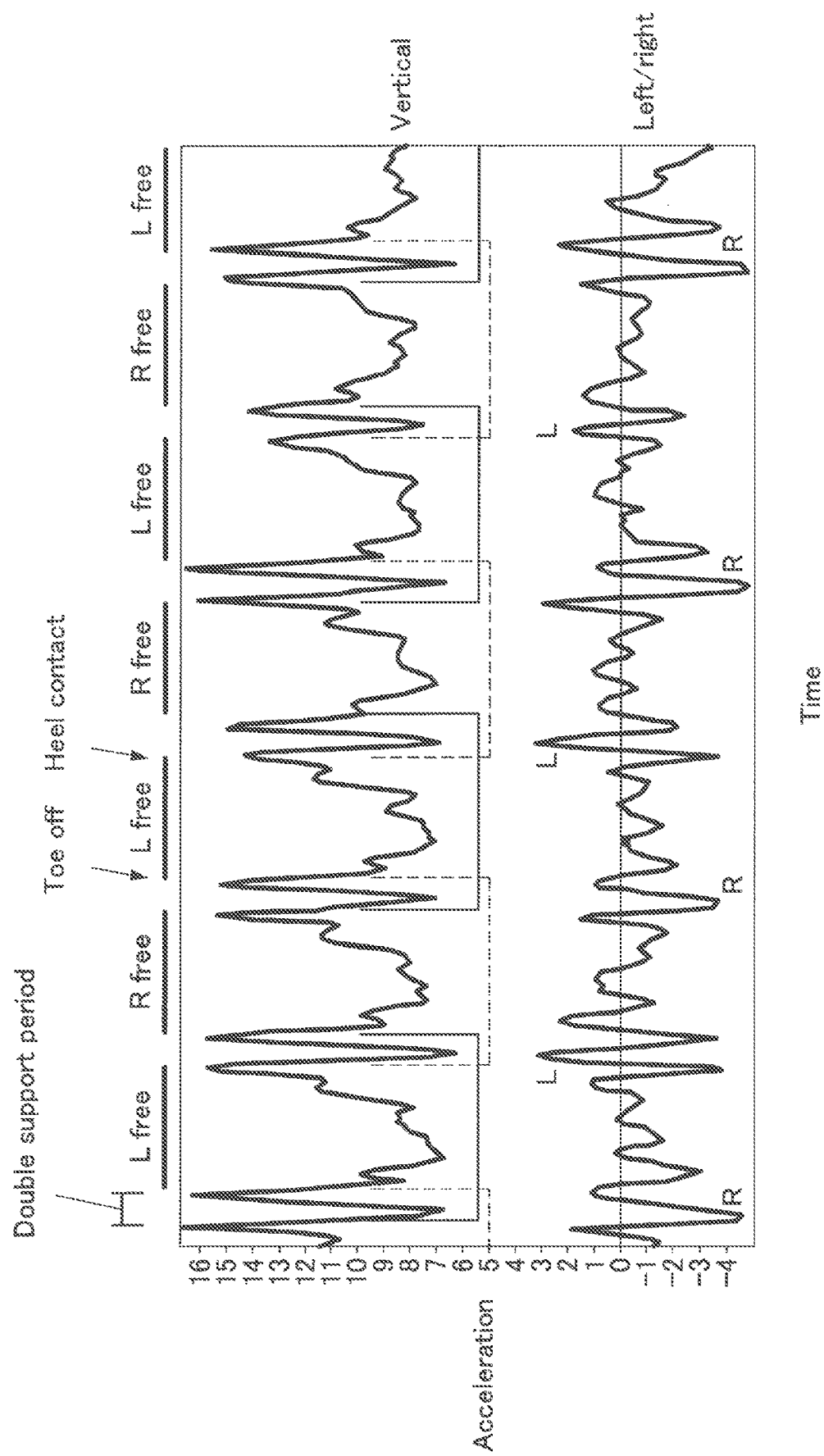
FIG. 5 is a diagram illustrating an example of time-series changes in acceleration during walking.

FIG. 5 is a diagram illustrating an example of time-series changes in acceleration during walking. In the example illustrated in FIG. 5, the data processing unit 132B extracts a section in which an acceleration in a vertical direction rapidly changes, as a section in which both feet are grounded ("Double support period" in FIG. 5). The data processing unit 132B acquires a distance between both feet in the section in which the both feet are grounded, as a step size. Thereby, it is possible to recognize the user's step size with a high level of accuracy.

Note that the user's step size recognized with a high level of accuracy in this manner may be used in various scenes. For example, the user's step size may be used in pedestrian dead reckoning (PDR) for specifying the position of a pedestrian by adding a length obtained by multiplying a step size and the number of steps by an initial position, and the like.

The recognition of a step size has been described above.

2.3. Determination of Tricks of Snowboarding

In the second embodiment of the present disclosure, the data processing unit 132B can obtain an action recognition result of a user on the basis of a distance between a first distance measuring sensor and a second distance measuring sensor and inertial sensor data in a case where the inertial sensor data satisfies a predetermined condition. As a specific example, determination of tricks of snowboarding will be described.

Figure 6A:
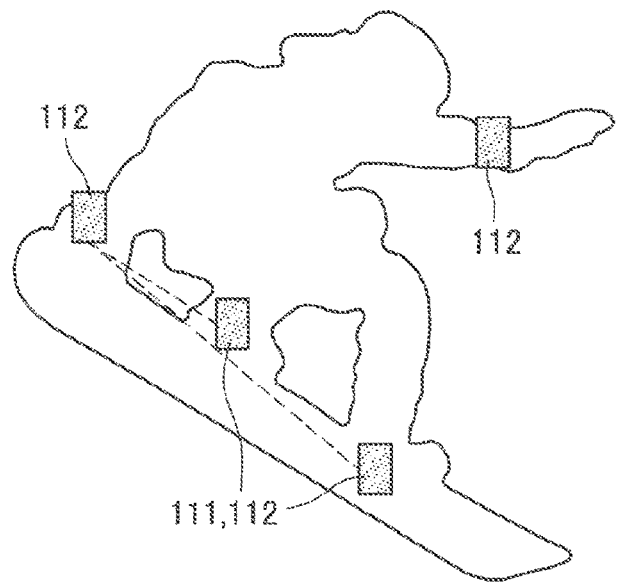
FIG. 6A is a diagram illustrating examples of various sensors attached to a user who is snowboarding.
Figure 6B:
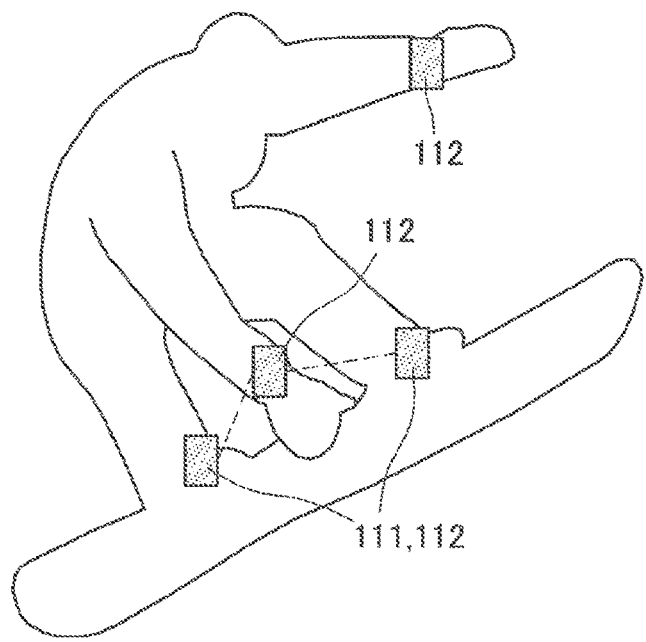
FIG. 6B is a diagram illustrating examples of various sensors attached to a user who is snowboarding.

FIGS. 6A and 6B are diagrams illustrating examples of various sensors attached to a user playing snowboarding. As illustrated in FIGS. 6A and 6B, the first distance measuring sensor (the distance measuring sensor 112) may be attached to each of the right wrist (alternatively, the right hand or the right arm) and the left wrist (alternatively, the left hand or the left arm) of the user, and the second distance measuring sensor (the distance measuring sensor 112) may be attached to each of the left foot and the right foot. The inertial sensor 111 may be attached to each of the left foot and the right foot, as illustrated in FIGS. 6A and 6B.

Figure 6C:
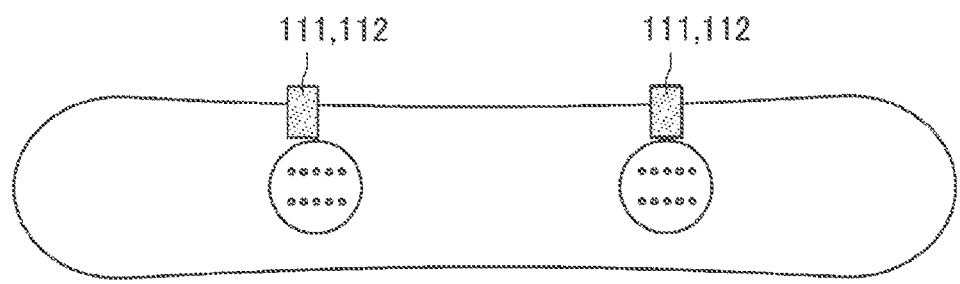
FIG. 6C is a diagram illustrating examples of various sensors attached to a user who is snowboarding and a board.
Figure 6D:
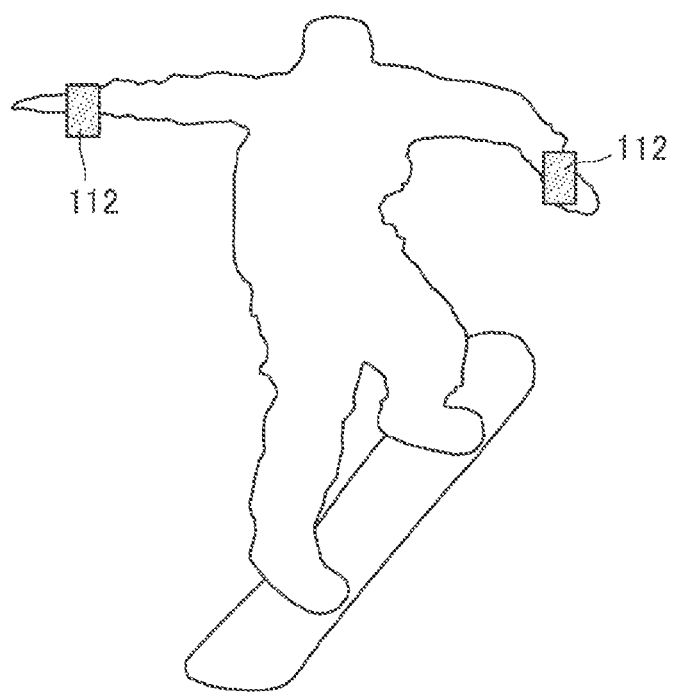
FIG. 6D is a diagram illustrating examples of various sensors attached to a user who is snowboarding and a board.

The attachment positions of the sensors are not limited to such examples. FIGS. 6C and 6D are diagrams illustrating examples of various sensors attached to a user playing snowboarding and a board. As illustrated in FIGS. 6C and 6D, the second distance measuring sensor (the distance measuring sensor 112) may be attached to each of a tiptoe region of the left foot and a tiptoe region of the right foot on the board. The inertial sensor 111 may be attached to each of the tiptoe region of the left foot and the tiptoe region of the right foot on the board, as illustrated in FIGS. 6C and 6D.

Here, a description is given of an example in which the second distance measuring sensor (the distance measuring sensor 112) is attached to the tiptoe region of the left foot and the tiptoe region of the right foot on the board, but the second distance measuring sensor (the distance measuring sensor 112) may be attached to each of a heel region of the left foot and a heel region of the right foot on the board. In a state where the plurality of distance measuring sensors 112 are attached in this manner, the data processing unit 132B can determine tricks of snowboarding on the basis of a distance between the first distance measuring sensor and the second distance measuring sensor and the inertial sensor data, in a case where the inertial sensor data satisfies a predetermined condition.

In addition, here, a description is given of an example in which an acceleration sensor, a gyroscope sensor, and a geomagnetic sensor are used as the inertial sensor 111. However, the types of sensors used as the inertial sensor 111 are not limited thereto. An acceleration, an angular velocity, and geomagnetic data may be a detection result obtained by any one of the inertial sensors 111 respectively attached to both feet (or the right and left regions on the board), or may be an average value of both the detection results. Alternatively, the acceleration, the angular velocity, and the geomagnetic data may be a detection result obtained by the inertial sensor 111 attached to a position other than the foot, in a case where the inertial sensor 111 is attached to the position other than the foot.

During snowboarding, the distance measuring sensors 112 are attached as illustrated in FIGS. 6A and 6B (or FIGS. 6C and 6D). In this case, attachment position information is added to a signal transmitted from the distance measuring sensor 112 attached to each of both wrists and both feet (or the right and left regions on the board) by the above-described method. The attachment position information may not include information regarding the right foot or the left foot (or the right region or the left region on the board), but is required to include information regarding the right wrist or the left wrist.

Figure 7:
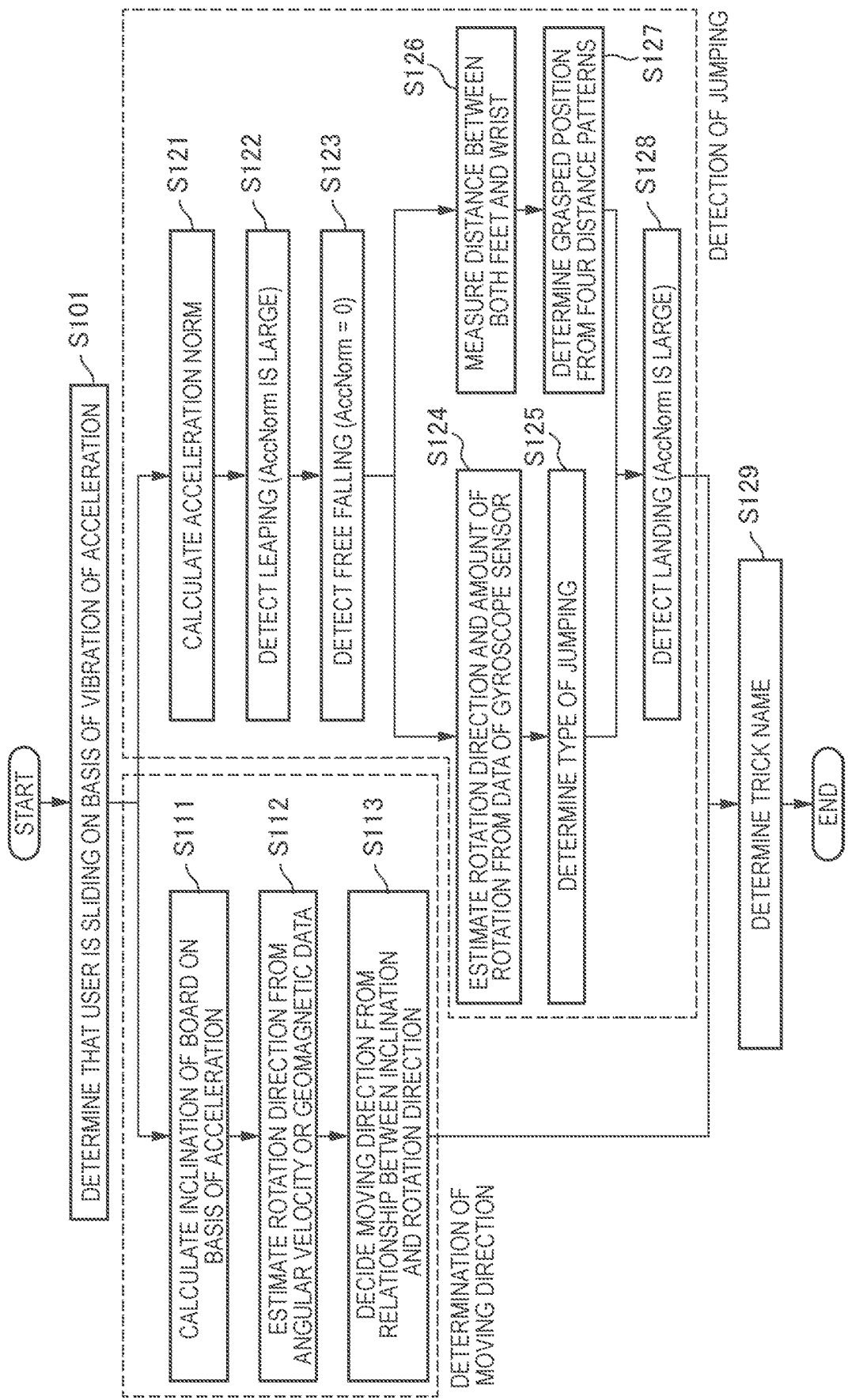
FIG. 7 is a flowchart illustrating an example of determination of tricks of snowboarding.

FIG. 7 is a flowchart illustrating an example of determination of tricks of snowboarding. First, the data processing unit 132B determines that the user is sliding using a board on the basis of the vibration of acceleration (S101). Subsequently, the data processing unit 132B performs determination of a moving direction (S111 to S113) and determination of jumping (S121 to S128). In the determination of the moving direction, the data processing unit 132B calculates an inclination of the board on the basis of the acceleration (S111), estimates a rotation direction from an angular velocity or geomagnetic data (S112), and decides the user's moving direction from a relationship between the inclination and the rotation direction (S113).

Figure 8:
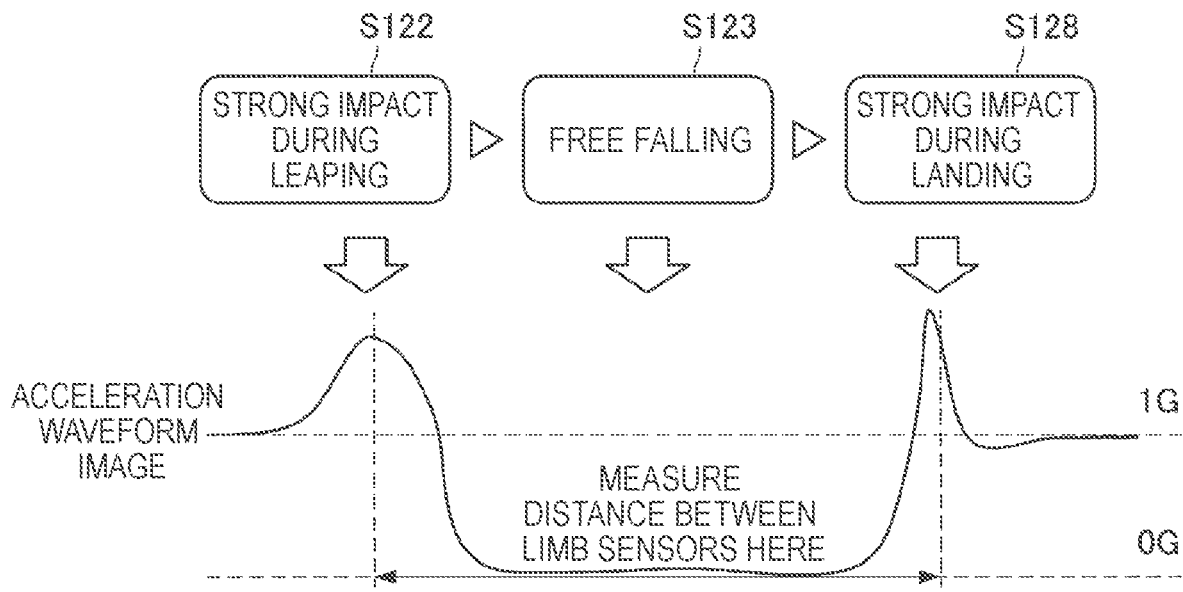
FIG. 8 is a diagram illustrating a method of detecting each of leaping, free falling, and landing of a user.

On the other hand, in the determination of jumping, the data processing unit 132B calculates an acceleration norm (S121). Here, a method of detecting each of leaping, free falling, and landing of the user will be specifically described. FIG. 8 is a diagram illustrating a method of detecting each of leaping, free falling, and landing of the user. As illustrated in FIG. 8, when the user is subject to strong impact at the time of leaping (S122), the amplitude of an acceleration norm becomes larger than a predetermined value (for example, 1 G).

On the other hand, when the user's free falling occurs (S123), an acceleration norm becomes smaller than the predetermined value (for example, the acceleration norm is set to 0). Further, when the user is subject to strong impact at the time of landing (S128), the amplitude of an acceleration norm becomes larger than the predetermined value (for example, 1 G). In this manner, each of leaping, free falling, and landing of the user may be detected.

The data processing unit 132B detects the user's leaping (acceleration norm: large) (S122), and detects free falling (acceleration norm: 0) (S123). In such a case, the data processing unit 132B estimates a rotation direction and the amount of rotation of the user from the data (angular velocity) of the gyroscope sensor, and determines the type of jumping from the rotation direction and the amount of rotation (S125).

In addition, the data processing unit 132B measures each of a distance between the right wrist and the right foot (the tiptoe region of the right foot), a distance between the right wrist and the left foot (the tiptoe region of the left foot), a distance between the left wrist and the right foot (the tiptoe region of the right foot), and a distance between the left wrist and the left foot (the tiptoe region of the left foot) (S126). The data processing unit 132B determines a position where the user's hand is grabbing the board from these four distance patterns (S127).

Figure 9:
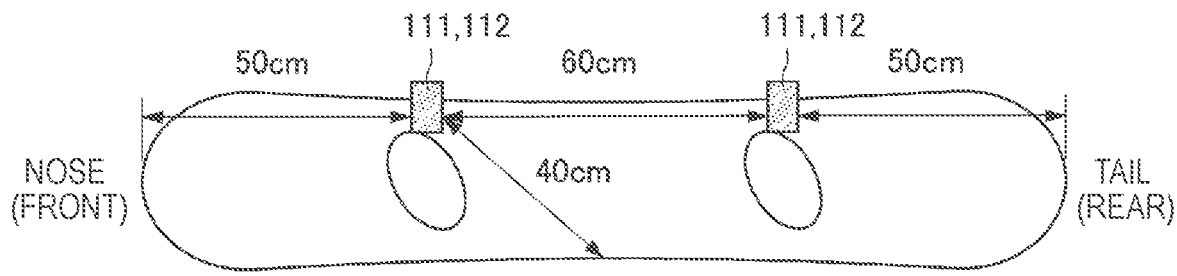
FIG. 9 is a diagram illustrating an example of dimensions of a board.

Subsequently, when the data processing unit 132B detects the user's landing (acceleration norm: large) (S128), the data processing unit determines a trick name from the moving direction and the position where the user's hand is grabbing the board (S129). FIG. 9 is diagram illustrating an example of dimensions of the board. Trick names to be described below may be determined on the basis of the dimensions illustrated in FIG. 9.

FIG. 10 is a diagram illustrating examples of determination of trick names. As illustrated in FIG. 10, the data processing unit 132B can recognize which position of the board the user is grabbing with which hand, on the basis of the user's moving direction and four distance patterns. As illustrated in FIG. 10, the data processing unit 132B can determine trick names on the basis of such recognition results.

The determination of tricks of snowboarding has been described above.

2.4. Determination of Kick Performance

In the second embodiment of the present disclosure, the data processing unit 132B can obtain an action recognition result of the user on the basis of a distance between the first distance measuring sensor and the second distance measuring sensor and inertial sensor data in a case where the inertial sensor data satisfies a predetermined condition. As a specific example, determination of a kick performance in soccer and determination of the speed of a kicked ball will be described.

Figure 11A:
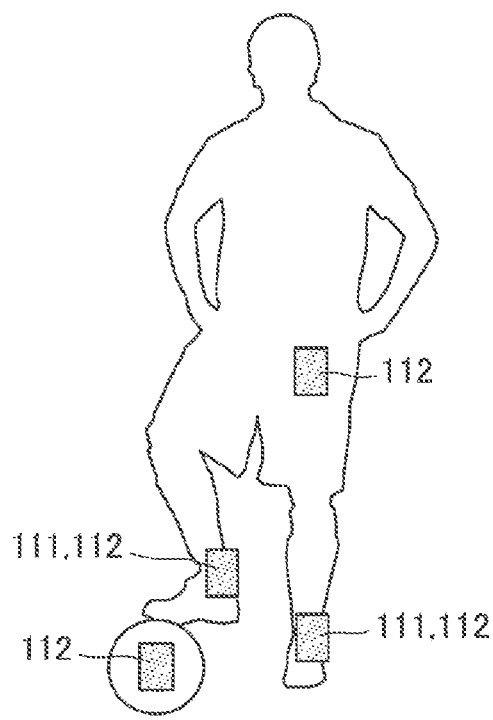
FIG. 11A is a diagram illustrating examples of various sensors attached to a user playing soccer.

FIG. 11A is a diagram illustrating examples of various sensors attached to a user playing soccer. As illustrated in FIG. 11A, the first distance measuring sensor (the distance measuring sensor 112) may be attached to each of the user's waist and a ball, and the second distance measuring sensor (the distance measuring sensor 112) may be attached to each of the left foot and the right foot of the user. The inertial sensor 111 may be attached to each of the left foot and the right foot, as illustrated in FIG. 11A. However, the attachment positions of the sensors are not limited to such examples. For example, the distance measuring sensor 112 may be attached to another part of the user's body instead of the user's waist.

In a state where the plurality of distance measuring sensors 112 are attached in this manner, the data processing unit 132B can determine a kick performance in soccer on the basis of the distance between the first distance measuring sensor (the distance measuring sensor 112 attached to the waist) and the second distance measuring sensor (the distance measuring sensor 112 attached to the left foot or the right foot), in a case where the inertial sensor data satisfies the predetermined condition. In addition, the data processing unit 132B can determine the speed of a kicked ball on the basis of the distance between the first distance measuring sensor (the distance measuring sensor 112 attached to the ball) and the second distance measuring sensor (the distance measuring sensor 112 attached to the left foot or the right foot), in a case where the inertial sensor data satisfies the predetermined condition.

In addition, here, a description is given of an example in which an acceleration sensor is used as the inertial sensor 111. However, the type of sensor used as the inertial sensor 111 is not limited thereto. For example, the sensor used as the inertial sensor 111 may be a gyroscope sensor, a geomagnetic sensor, a vibration sensor, or another sensor.

During playing soccer, the distance measuring sensors 112 are attached as illustrated in FIG. 11A. In this case, attachment position information may be added to a signal transmitted from the distance measuring sensor 112 attached to each of both feet, the waist, and the ball by the above-described method. For example, as described above, the inertial sensor data is made to be learned for each attachment position, and each of the plurality of distance measuring sensors 112 can recognize the attachment position on the basis of collation between the corresponding inertial sensor data and a learning result.

For example, in the inertial sensor attached to the waist, it is estimated that substantially equal changes in acceleration are shown even in a case where any foot is grounded. In addition, in the inertial sensor attached to the waist, it is estimated that more periodical changes in acceleration are shown in the up-down direction than in the front-back direction. On the other hand, in the inertial sensor attached to both feet, it is estimated that greater changes in acceleration are shown when one foot is grounded than when the other foot is grounded. In addition, in the inertial sensor attached to both feet, it is estimated that changes in acceleration in the front-back direction become larger than a certain degree when the ball is kicked.

In the attachment position information, the signal transmitted from the right and left feet may not include information regarding the right foot or the left foot. In addition, it is preferable that pairing is performed between the distance measuring sensors 112 (the distance measuring sensors 112 attached to both feet, the waist, and the ball) for each player by the above-described method. During playing soccer, it is assumed that there are a plurality of players, but the distance measuring sensor 112 attached to the ball is subjected to pairing in common with each player.

Figure 11B:
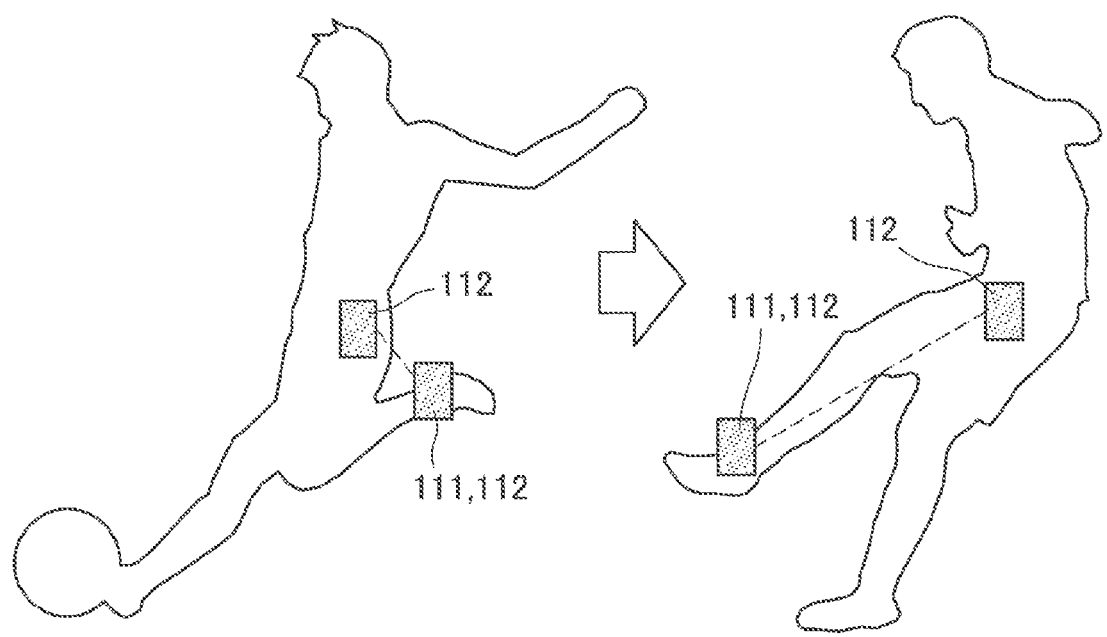
FIG. 11B is a diagram illustrating examples of changes in a distance between distance measuring sensors attached to a waist and a right foot (or a left foot).

In the determination of a kick performance, a distance between the distance measuring sensors 112 respectively attached to the waist and the right foot (or the left foot) is used as described above. FIG. 11B is a diagram illustrating examples of changes in a distance between the distance measuring sensors 112 respectively attached to the waist and the right foot (or the left foot). As illustrated in FIG. 11B, a swing becomes larger as a kick becomes stronger, and thus it is assumed that a distance between the distance measuring sensors 112 respectively attached to the waist and the right foot (or the left foot) becomes shorter at the beginning of the kicking. Examples of a strong kick include an instep kick during shooting, and the like.

In addition, as illustrated in FIG. 11B, a follow-through becomes larger as a kick becomes stronger, and thus it is assumed that a distance between the distance measuring sensors 112 respectively attached to the waist and the right foot (or the left foot) becomes shorter at the end of the kicking. As an example, it may be determined whether a kick performance is good or bad, in accordance with whether the distance between the distance measuring sensors 112 respectively attached to the waist and the right foot (or the left foot) is short or long at the beginning and end of the kicking.

Figure 12:
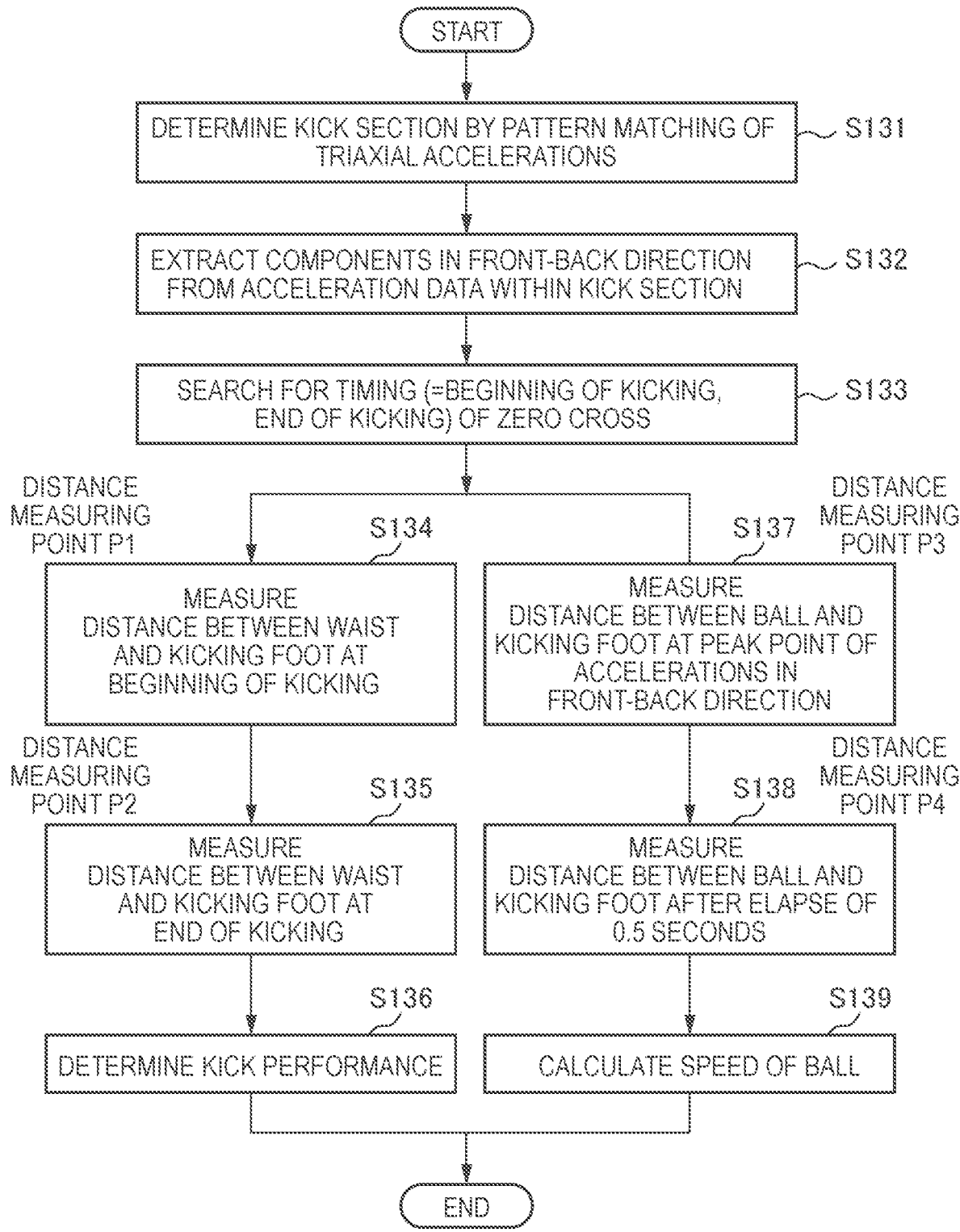
FIG. 12 is a flowchart illustrating an example of determination of a kick performance in soccer and determination of the speed of a kicked ball.
Figure 13:
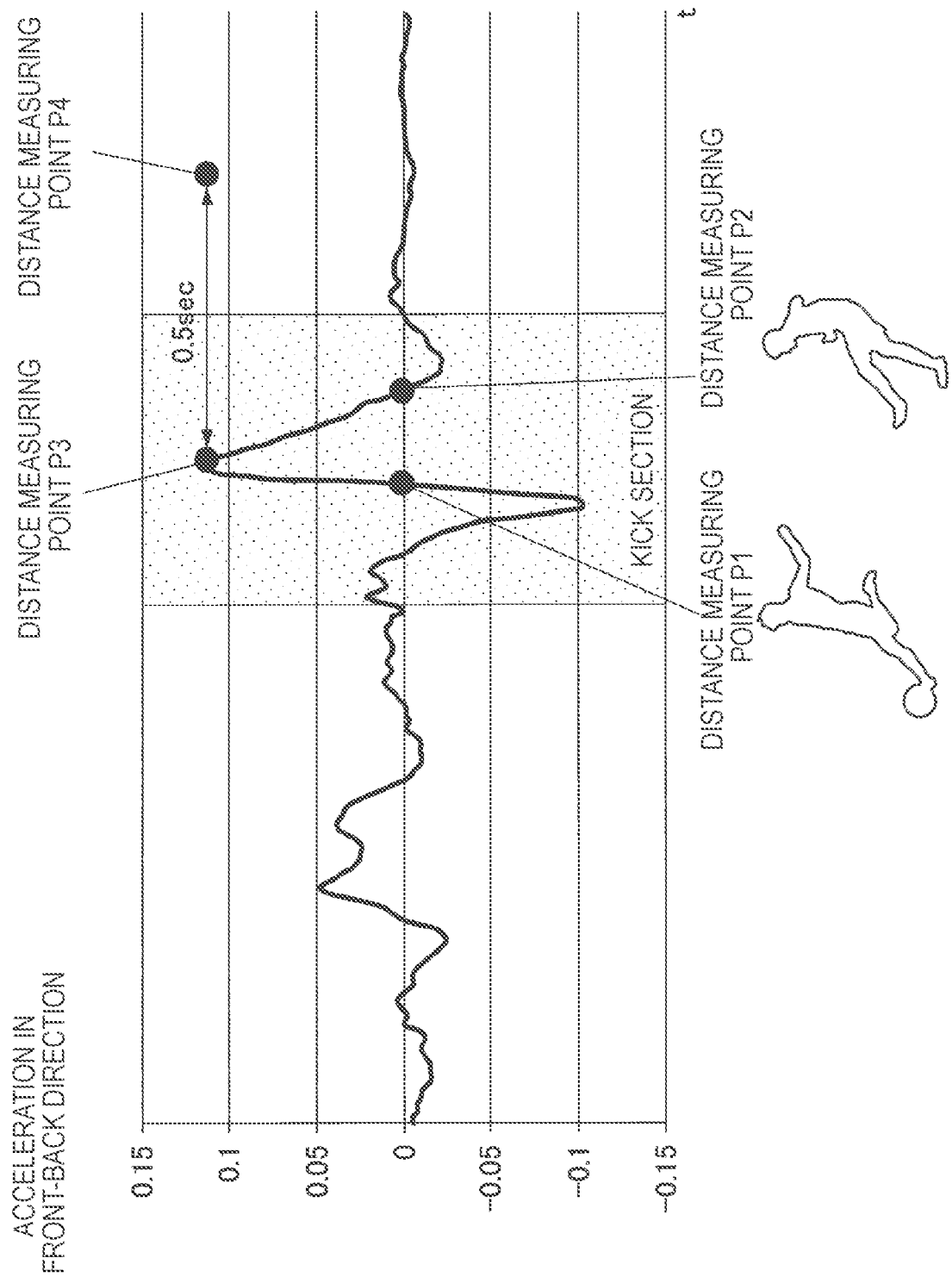
FIG. 13 is a diagram illustrating a state of time-series changes in acceleration in a front-back direction during kicking of a ball.

FIG. 12 is a flowchart illustrating an example of determination of a kick performance in soccer and determination of the speed of a kicked ball. In addition, FIG. 13 is a diagram illustrating a state of time-series changes in acceleration in a front-back direction during kicking of a ball. First, as illustrated in FIG. 13, the data processing unit 132B determines a kick section by pattern matching of triaxial accelerations detected by the inertial sensor 111 (S131). Subsequently, the data processing unit 132B extracts components in the front-back direction from acceleration data within the kick section (S132).

It is considered that an acceleration in the front-back direction is set to zero at the beginning and end of the kicking, and thus the data processing unit 132B searches for the timing of a zero cross of the acceleration in the front-back direction (S133). More specifically, the data processing unit 132B detects a timing when the absolute value of the acceleration in the front-back direction exceeds a threshold value at the first time and then is first set to zero, as the beginning of the kicking ("a distance measuring point P1" in FIG. 13), and detects a timing when the absolute value of the acceleration in the front-back direction exceeds the threshold value at the second time and then is first set to zero, as the end of the kicking ("a distance measuring point P2" in FIG. 13).

Note that, here, a description is given of an example in which the timing of a zero cross of an acceleration in the front-back direction is detected as timings of the beginning and end of kicking. However, the detection of the beginning and end of kicking may be performed in any way. For example, in a case where the accuracy of pattern matching is equal to or higher than a certain degree, it is considered that the data processing unit 132B can also detect the beginning and end of kicking when determining a kick section by pattern matching.

Subsequently, the data processing unit 132B measures a distance between the waist and a kicking foot at the beginning of the kicking ("the distance measuring point P1" in FIG. 13) (S134). Specifically, the data processing unit 132B measures a distance between the distance measuring sensors 112 respectively attached to the waist and right foot (or the left foot) at the beginning of the kicking. The data processing unit 132B measures a distance between the waist and the kicking foot at the end of kicking ("the distance measuring point P2" in FIG. 13) (S135). Specifically, the data processing unit 132B measures a distance between the distance measuring sensors 112 respectively attached to the waist and the right foot (or the left foot) at the end of the kicking.

Subsequently, the data processing unit 132B performs determination of a kick performance on the basis of the distance between the waist and the kicking foot at the beginning of the kicking and the distance between the waist and the kicking foot at the end of the kicking. As an example, in a case where a kick performance is associated with the distance between the waist and the kicking foot at the beginning of the kicking and the distance between the waist and the kicking foot at the end of the kicking, the data processing unit 132B may acquire the kick performance and use the acquired kick performance as a determination result.

In addition, FIG. 14 is a diagram illustrating an example of a kick performance determination table. As illustrated in FIG. 14, in a case where it is possible to determine the type of kick from inertial sensor data (impact applied to a foot during kicking), which is detected by the inertial sensor 111, the data processing unit 132B may acquire a kick performance with respect to the distance between the waist and the kicking foot at the beginning of the kicking, the distance between the waist and the kicking foot at the end of the kicking, and the type of kick from the kick performance determination table, and may use the acquired kick performance as a determination result. Note that the determination of the type of kick may be performed in any way. As an example, the type of kick may be determined by pattern matching to be performed on the inertial sensor data.

Subsequently, the data processing unit 132B measures a distance between the ball and the kicking foot at a peak point ("a distance measuring point P3" in FIG. 13) of accelerations in the front-back direction from the beginning of the kicking to the end of the kicking (S137). Specifically, the data processing unit 132B measures a distance between the distance measuring sensors 112 respectively attached to the waist and the right foot (or the left foot) at the peak point of the accelerations in the front-back direction from the beginning of the kicking to the end of the kicking.

The data processing unit 132B measures a distance between the ball and the kicking foot after the elapse of 0.5 seconds ("the distance measuring point P4" in FIG. 13) from the peak point ("the distance measuring point P3" in FIG. 13) of the accelerations in the front-back direction from the beginning of the kicking to the end of the kicking (S138). Note that the elapsed time from the peak point ("the distance measuring point P3" in FIG. 13) of the accelerations in the front-back direction from the beginning of the kicking to the end of the kicking may be a time other than 0.5 seconds. The data processing unit 132B can calculate the speed of the ball by dividing a difference between the two distances by the elapsed time (S139).

The determination of a kick performance in soccer and determination of the speed of a kicked ball have been described above.

2.5. Determination of Performance of Golf Swing

In the second embodiment of the present disclosure, the data processing unit 132B can obtain an action recognition result of the user on the basis of distances between a first distance measuring sensor and a second distance measuring sensor, a third distance measuring sensor, and a fourth distance measuring sensor in a case where inertial sensor data satisfies a predetermined condition. As a specific example, determination of performance of a golf swing will be described.

Figure 15A:
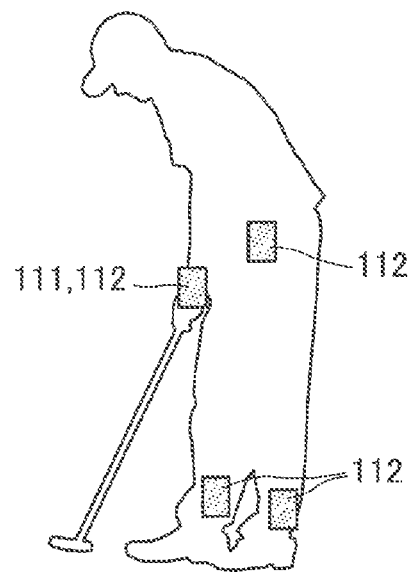
FIG. 15A is a diagram illustrating examples of various sensors attached to a user performing a golf swing.

FIG. 15A is a diagram illustrating examples of various sensors attached to a user performing a golf swing. As illustrated in FIG. 15A, the first distance measuring sensor (the distance measuring sensor 112) may be attached to at least one wrist (or a hand) of the user, and the second distance measuring sensor (the distance measuring sensor 112) may be attached to the waist. In addition, the third distance measuring sensor (the distance measuring sensor 112) may be attached to the left foot, and the fourth distance measuring sensor (the distance measuring sensor 112) may be attached to the right foot.

The inertial sensor 111 may be attached to at least one wrist (or a hand) as illustrated in FIG. 15A. However, the attachment positions of the sensors are not limited to such examples. For example, the distance measuring sensor 112 may be attached to other parts of the user's body, instead of the waist, the right foot, and the left foot of the user. In addition, the distance measuring sensor 112 may be attached to the user's hand instead of the user's wrist, or the distance measuring sensor 112 may be attached to the user's arm.

In a state where the plurality of distance measuring sensors 112 are attached in this manner, the data processing unit 132B can estimate a track of a golf club swung by the user, on the basis of the distances between the first distance measuring sensor (the distance measuring sensor 112 attached to the wrist) and the second distance measuring sensor (the distance measuring sensor 112 attached to the waist), the third distance measuring sensor (the distance measuring sensor 112 attached to the left foot), and the fourth distance measuring sensor (the distance measuring sensor 112 attached to the right foot), in a case where the inertial sensor data satisfies the predetermined condition.

In addition, here, a description is given of an example in which an acceleration sensor and a gyroscope sensor are used as the inertial sensor 111. However, the types of sensors used as the inertial sensor 111 are not limited thereto. For example, the sensor used as the inertial sensor 111 may be a geomagnetic sensor, a vibration sensor, or other sensors.

During a golf swing, the distance measuring sensors 112 are attached as illustrated in FIG. 15A. In this case, attachment position information may be added to a signal transmitted from the distance measuring sensor 112 attached to each of the wrist, the waist, and both feet by the above-described method. For example, as described above, the inertial sensor data is made to be learned for each attachment position, and each of the plurality of distance measuring sensors 112 can recognize the attachment position on the basis of collation between the corresponding inertial sensor data and a learning result.

A timing when the attachment position is recognized is not particularly limited. For example, the attachment position may be recognized while the user is moving to a hole in a golf course. Note that, in the attachment position information, it is preferable that a signal transmitted from the right and left feet includes information regarding the right foot or the left foot.

Figure 15B:
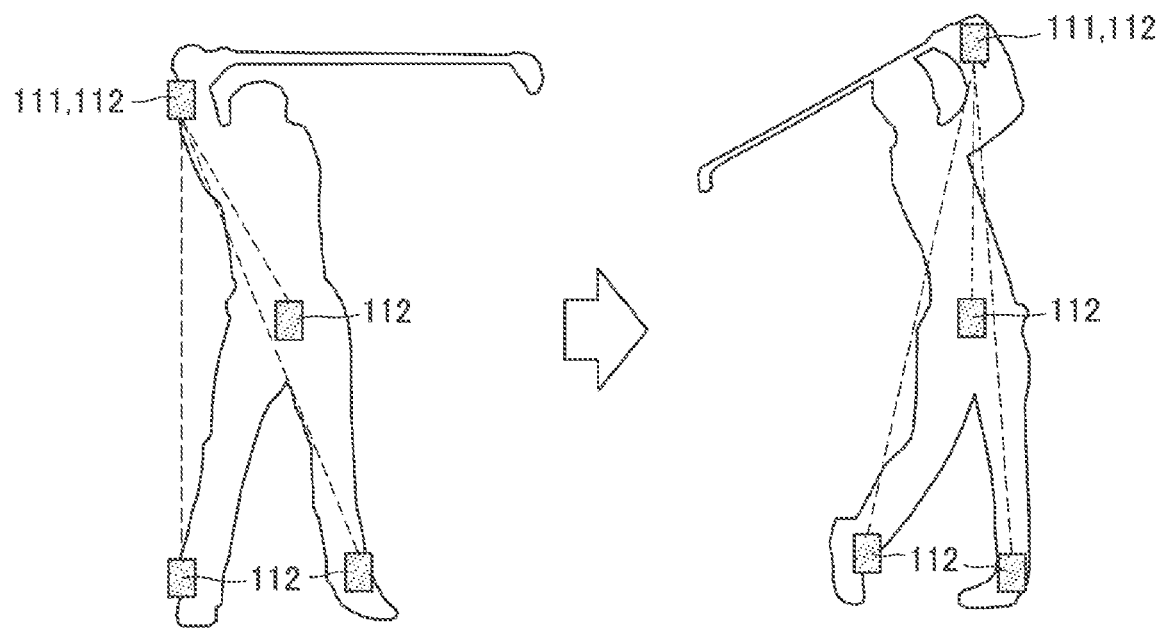
FIG. 15B is a diagram illustrating an example of changes in a distance between a distance measuring sensor attached to a wrist and a distance measuring sensor attached to each of a waist and both feet.

In the determination of performance of a golf swing, distances between the distance measuring sensors 112 respectively attached to the wrist, the waist, and both feet are used as described above. FIG. 15B is a diagram illustrating an example of changes in a distance between the distance measuring sensor 112 attached to the wrist and the distance measuring sensor 112 attached to each of the waist and both feet. Referring to FIG. 15B, the distance between the distance measuring sensor 112 attached to the wrist and the distance measuring sensor 112 attached to each of the waist and both feet changes, and it is determined whether a golf swing is good or bad on the basis of the changes in the distance.

Figure 16:
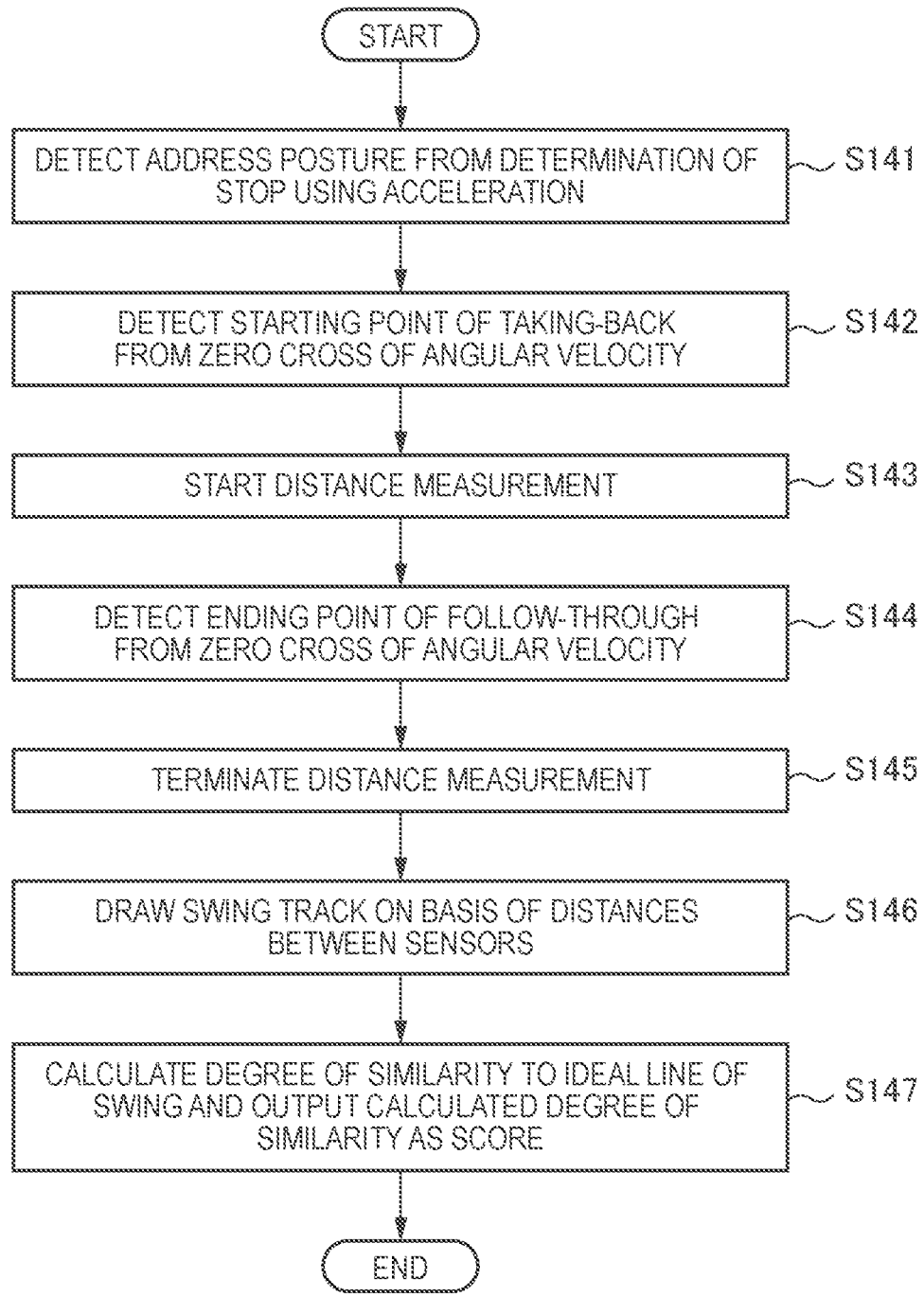
FIG. 16 is a flowchart illustrating an example of determination of performance of a golf swing.
Figure 17:
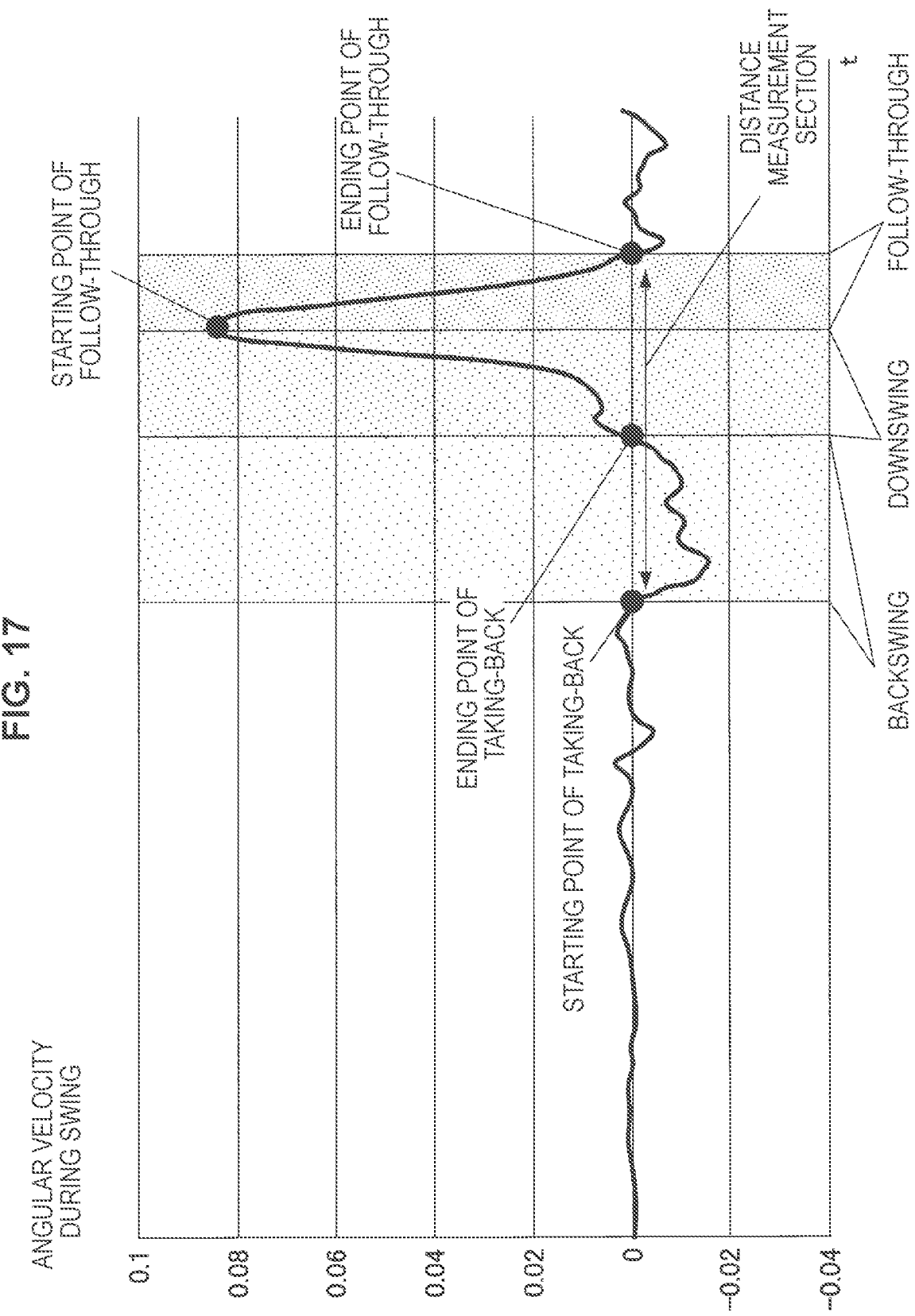
FIG. 17 is a diagram illustrating a state of time-series changes in an angular velocity during a swing.

FIG. 16 is a flowchart illustrating an example of determination of performance of a golf swing. In addition, FIG. 17 is a diagram illustrating a state of time-series changes in an angular velocity during a swing. First, the data processing unit 132B detects an address posture of the user from determination of stop using an acceleration (S141). Subsequently, as illustrated in FIG. 17, the data processing unit 132B detects a starting point of taking-back from a zero cross of an angular velocity (S142).

The data processing unit 132B starts distance measurement when the starting point of the taking-back is detected (S143). More specifically, the data processing unit 132B starts measuring a distance between the distance measuring sensor 112 attached to the wrist and the distance measuring sensor 112 attached to each of the waist and both feet. In addition, the data processing unit 132B detects an ending point of the taking-back from a zero cross of an angular velocity appearing next, and detects an ending point of a follow-through from the zero cross of the angular velocity appearing next (S144).

The data processing unit 132B terminates the distance measurement when detecting the ending point of the follow-through (S145). The data processing unit 132B generates a swing track on the basis of the distances between the sensors, and the output control unit 133B draws the swing track (S146). More specifically, the data processing unit 132B draws a track of a golf club on the basis of the distance between the distance measuring sensor 112 attached to the wrist and the distance measuring sensor 112 attached to each of the waist and both feet.

Figure 18:
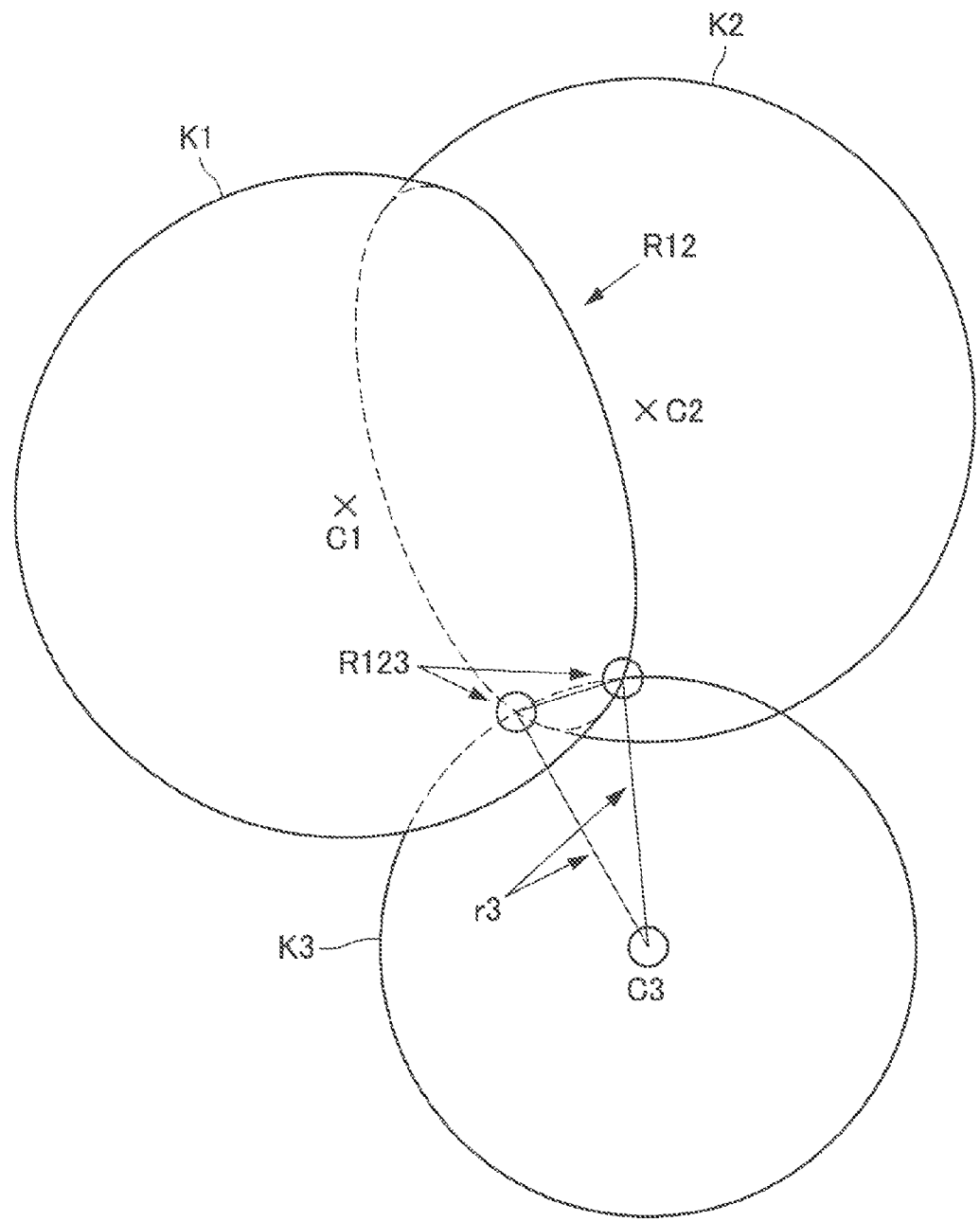
FIG. 18 is a diagram illustrating a method of drawing a swing track.
Figure 19:
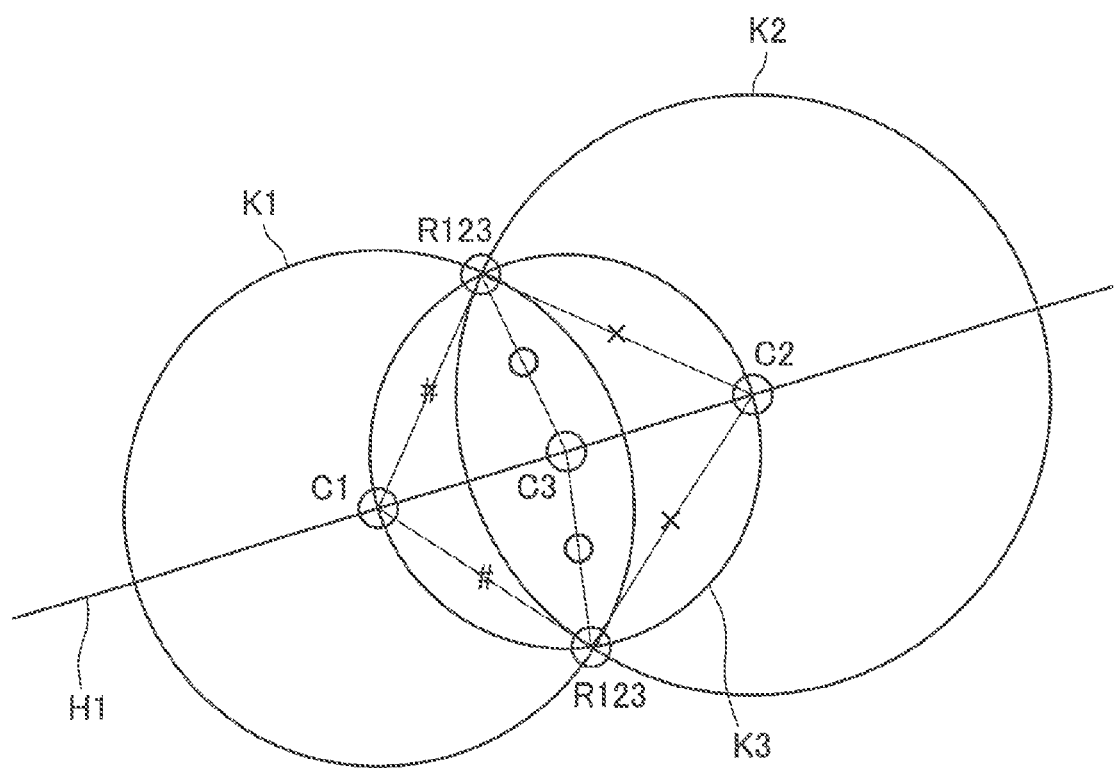
FIG. 19 is a diagram illustrating a method of drawing a swing track.

A method of drawing a swing track on the basis of a distance between the sensors will be described in more detail. FIGS. 18 and 19 are diagrams illustrating a method of drawing a swing track. As illustrated in FIG. 18, a set of points equidistant from the distance measuring sensor 112 attached to the left foot (the position of a point C1) are represented as a spherical surface K1. Similarly, a set of points equidistant from the distance measuring sensor 112 attached to the right foot (the position of a point C2) are represented as a spherical surface K2. An intersection point R12 between the spherical surface K1 and the spherical surface K2 is represented as a circle.

Further, there are two intersection points R123 between a spherical surface K3 which is a set of points equidistant (radius r3) from the distance measuring sensor 112 attached to the waist (the position of a point C3) and the circle (the intersection point R12), except for special cases. As these special cases, a case where there is no intersection point between three spherical surfaces and a case where three spherical surfaces intersect each other at one point are assumed. Further, except these cases, in a case where the center of the third spherical surface is on a straight line passing through the center of the spherical surface K1 and the center of the spherical surface K2, it is assumed that the intersection point between the three spherical surfaces is a circle (the intersection point R12).

In addition, as illustrated in FIG. 19, the two intersection points R123 are positioned on both sides of a plane H1 passing through all of the distance measuring sensor 112 attached to the left foot (the position of the point C1), the distance measuring sensor 112 attached to the right foot (the position of the point C2), and the distance measuring sensor 112 attached to the waist (the position of the point C3). However, in a case where a golf swing is performed, it is considered that the user's wrist is positioned on one side (the front side of the user's body) of the plane H1, and thus it is possible to detect a point on one side of the plane H1 out of the two intersection points R123, as the position of the user's wrist.

The data processing unit 132B can generate a track of the position of the user's wrist by arranging the positions of the user's wrist, which are detected in this manner, in time series. The data processing unit 132B can generate a swing track on the basis of the track of the position of the user's wrist. Here, it is assumed that the data processing unit 132B estimates the tip position of the golf club from the position of the user's wrist and generates a track of the tip position of the golf club as a swing track. In this case, the estimation of the tip position of the golf club may be performed in any way.

Figure 20:
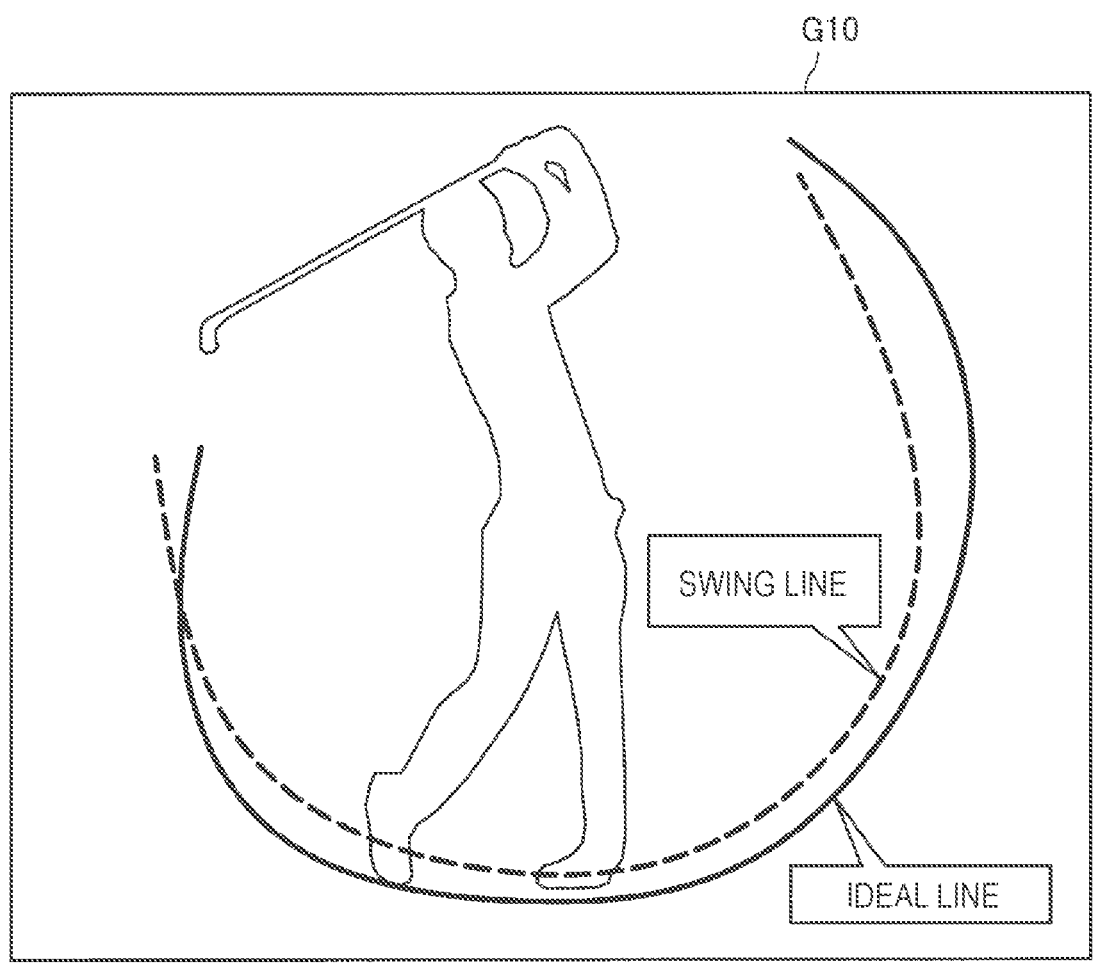
FIG. 20 is a diagram illustrating an example of a swing track display screen.

FIG. 20 is a diagram illustrating an example of a swing track display screen. As illustrated in FIG. 20, the output control unit 133B can draw a swing track ("a swing line" in FIG. 20) on a swing track display screen G10. Further, the output control unit 133B can also draw an ideal swing track ("an ideal line" in FIG. 20) which is prepared in advance. Note that these tracks are drawn at an angle with the front of the user facing forward in the example illustrated in FIG. 20, but these tracks can be drawn from various angles in a case where these tracks are three-dimensionally generated.

A description will be continued referring back to FIG. 16. The data processing unit 132B can also calculate the degree of similarity between the swing track ("the swing line" in FIG. 20) and the ideal swing track ("the ideal line" in FIG. 20) as a score. The calculation of the degree of similarity may be performed in any way. As an example, the output control unit 133B may calculate the degree of similarity using a Euclidean distance between the positions of these tracks at the corresponding times.

The output control unit 133B can output the score which is calculated in this manner (S147). Here, the output of the score may be performed in any way. For example, the output control unit 133B may display the score at a predetermined position on the swing track display screen G10. The user can confirm how much the user's own swing is similar to an ideal swing, on the basis of these tracks and the score.

The determination of performance of a golf swing has been described above.

3. Third Embodiment (Distance Measuring Sensor+Inertial Sensor+Proximity Sensor)

Subsequently, a third embodiment of the present disclosure will be described. In the third embodiment of the present disclosure, a description will be given of a case where proximity sensor data detected by a proximity sensor is also used in order to recognize a user's action, in addition to using distance measuring sensor data detected by a distance measuring sensor and inertial sensor data detected by an inertial sensor.

3.1. Functional Configuration Example

Figure 21:
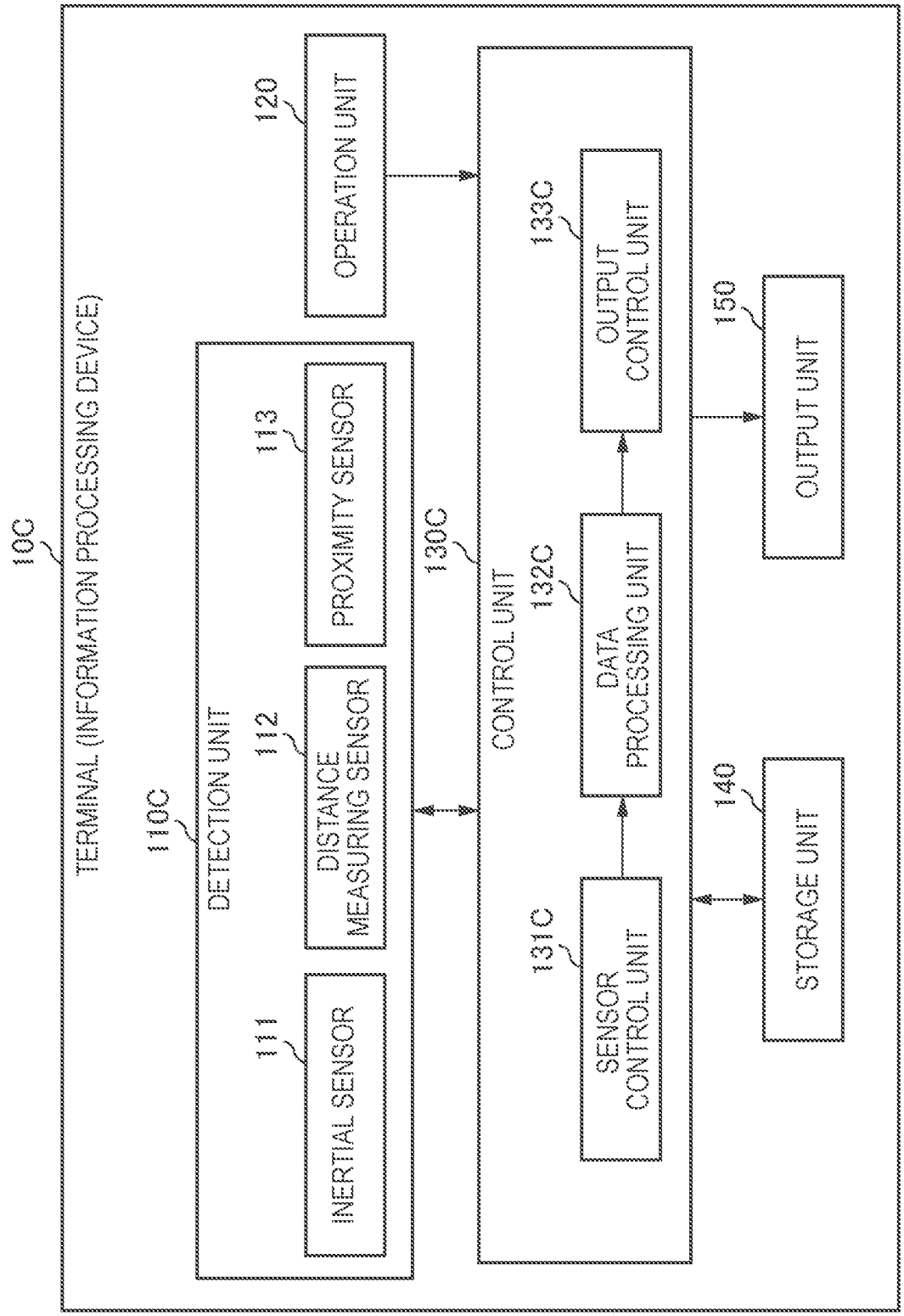
FIG. 21 is a diagram illustrating a functional configuration example of an information processing device according to the second embodiment of the present disclosure.

Subsequently, a functional configuration example of an information processing device 10C according to the third embodiment of the present disclosure will be described. FIG. 21 is a diagram illustrating the functional configuration example of the information processing device 10C according to the third embodiment of the present disclosure. As illustrated in FIG. 21, the information processing device 10C includes a detection unit 110C, an operation unit 120, a control unit 130C, a storage unit 140, and an output unit 150. Hereinafter, a description will be mainly given of functional blocks (the detection unit 110C and the control unit 130C), which are different from those of the information processing device 10C according to the second embodiment of the present disclosure, in the information processing device 10C according to the third embodiment of the present disclosure.

The detection unit 110C includes a proximity sensor 113 in addition to an inertial sensor 111 and a distance measuring sensor 112. Note that the type of proximity sensor 113 is not particularly limited, but the proximity sensor 113 may include a communication device for near field communication, as an example. In the example illustrated in FIG. 21, one proximity sensor 113 is shown, but the detection unit 110C actually includes a plurality of proximity sensors 113. Note that, here, a case where the inertial sensor 111 is an acceleration sensor is mainly assumed, but the type of inertial sensor 111 is not particularly limited. For example, the inertial sensor 111 may be a gyroscope sensor.

The control unit 130C controls each of the units of the information processing device 10C. As illustrated in FIG. 21, the control unit 130C includes a sensor control unit 131C, a data processing unit 132C, and an output control unit 133C. These functional blocks will be described later in detail. Note that the control unit 130C may be constituted by, for example, CPU or the like. In a case where the control unit 130C is constituted by a processing device such as CPU, the processing device may be constituted by an electronic circuit.

In the present embodiment, the sensor control unit 131C acquires distance measuring sensor data detected by the plurality of distance measuring sensors 112 and inertial sensor data detected by one or a plurality of inertial sensors 111, and acquires proximity sensor data detected by a plurality of proximity sensors 113. In addition, the data processing unit 132C obtains an action recognition result of the user by analyzing the distance measuring sensor data, the inertial sensor data, and the proximity sensor data. The output control unit 133C controls output according to the action recognition result. According to such a configuration, it is possible to improve the accuracy of recognition of the user's action.

The control of output which is performed by the output control unit 133C may be performed in the same manner as the control of output which is performed by the output control unit 133A according to the first embodiment of the present disclosure, and thus a description of details of the function of the output control unit 133C will be omitted.

The functional configuration example of the information processing device 10C according to the third embodiment of the present disclosure has been described above.

3.2. Action Recognition Related to Interaction

In the third embodiment of the present disclosure, the plurality of distance measuring sensors 112 are dispersively attached to a plurality of users. As a specific example, an action related to an interaction between the plurality of users will be described. That is, a first distance measuring sensor is attached to a first user, and a second distance measuring sensor is attached to a second user.

In a case where the inertial sensor data satisfies a predetermined first condition and a distance between the first distance measuring sensor and the second distance measuring sensor satisfies a predetermined second condition, the data processing unit 132C can obtain an action according to the first condition and the second condition as an action recognition result. In this case, when the proximity sensor data additionally satisfies a predetermined third condition, the data processing unit 132C may obtain an action according to the first condition, the second condition, and the third condition as an action recognition result.

Figure 22A:
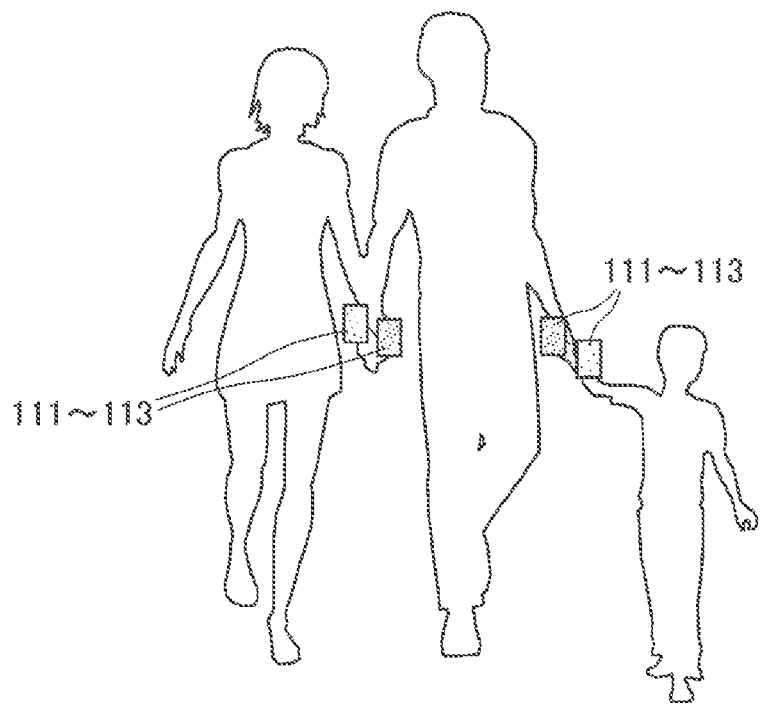
FIG. 22A is a diagram illustrating a state where three users are walking hand in hand.
Figure 22B:
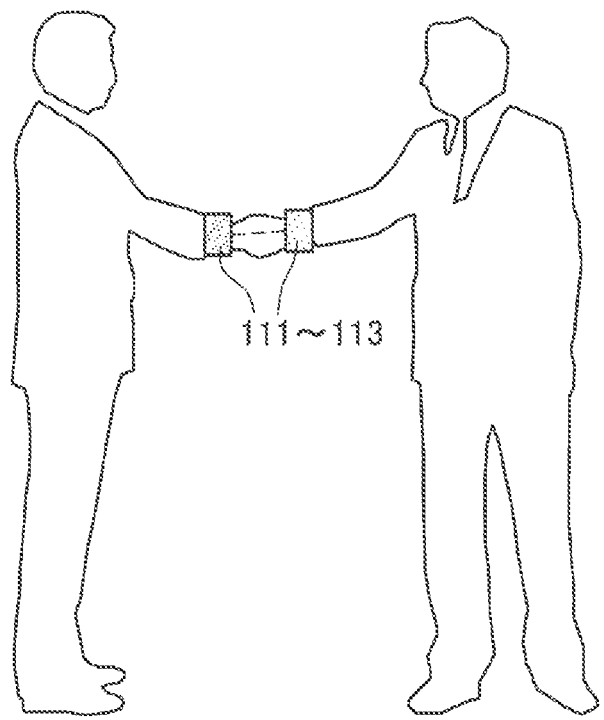
FIG. 22B is a diagram illustrating a state where two users are shaking hands.
Figure 22C:
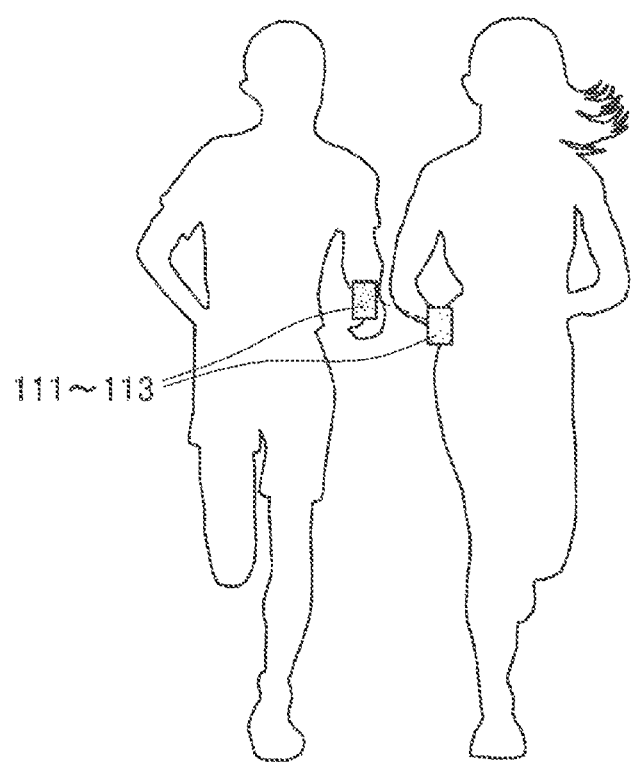
FIG. 22C is a diagram illustrating a state where two users are running in parallel.

FIG. 22A is a diagram illustrating a state where three users are walking hand in hand. FIG. 22B is a diagram illustrating a state where two users are shaking hands. FIG. 22C is a diagram illustrating a state where two users are running in parallel. As illustrated in FIGS. 22A, 22B, and 22C, the inertial sensor 111, the distance measuring sensor 112, and the proximity sensor 113 may be attached to one wrist (or both wrists) of each of the plurality of users. The attachment positions of the sensors are not limited to such examples. For example, in the cases illustrated in FIGS. 22A and 22C, the inertial sensor 111 may be attached to any part of the user's body.

Additionally, in order to make it possible to specify a plurality of users having an interaction, identification information of the users may be added to a signal transmitted from each of the plurality of distance measuring sensors 112. Regarding registration of the identification information of the user, the identification information of the user may be registered in the distance measuring sensor 112 through near field communication or the like by performing a predetermined registration operation (for example, an operation of pressing down a registration start button, or the like) on a mobile terminal (for example, a smartphone or the like). Information regarding the plurality of users having an interaction may be recorded in a predetermined region as a history.

FIG. 23 a diagram illustrating an example of a determination table of actions related to an interaction between a plurality of users. As illustrated in FIG. 23, in a case where the inertial sensor data of three users illustrated in FIG. 22A indicates periodic vibration (for example, 1 Hz to 4 Hz), the data processing unit 132C can recognize that three persons are walking. In a case where a received signal strength indicator (RSSI) of the proximity sensor data received from the other two users illustrated in FIG. 22A exceeds a predetermined threshold value in each of the three users, the data processing unit 132C can determine that three persons are nearby.

In a case where it is determined that the distance measuring sensor 112 of each of the three users illustrated in FIG. 22A is within a predetermined distance (for example, 20 cm) from at least the distance measuring sensor of the other user, the data processing unit 132C can determine that three persons are holding hands. In a case where a condition related to each of the inertial sensor data, the proximity sensor data, and the distance measuring sensor data is satisfied, the data processing unit 132C may determine that three users are walking hand in hand.

In addition, as illustrated in FIG. 23, the data processing unit 132C can detect vibration having an amplitude which is large in the up-down direction of the wrists of two users illustrated in FIG. 22B at such an inclination that the thumbs faces vertically upward, on the basis of the inertial sensor data of the two users. Note that both such an inclination and vibration may not be detected, and only one of them may be detected. In addition, the direction of the vibration may not be an up-down direction. In a case where RSSI of the proximity sensor data received from the other user exceeds the predetermined threshold value in each of the two users illustrated in FIG. 22B, the data processing unit 132C can determine that two persons are nearby.

In addition, the data processing unit 132C can determine that the distance measuring sensor 112 of each of the two users illustrated in FIG. 22B is within a predetermined distance (for example, 20 cm) from the distance measuring sensor of the other user. In a case where a condition related to each of the inertial sensor data, the proximity sensor data, and the distance measuring sensor data is satisfied, the data processing unit 132C may determine that two users are shaking hands.

In addition, as illustrated in FIG. 23, in a case where the inertial sensor data of the two users illustrated in FIG. 22C indicates periodic vibration (for example, equal to or higher than 4 Hz), the data processing unit 132C can recognize that two users are running. In a case where RSSI of the proximity sensor data received from the other user exceeds the predetermined threshold value in each of the two users illustrated in FIG. 22C, the data processing unit 132C can determine that two persons are nearby.

In addition, the data processing unit 132C can determine that the distance measuring sensor 112 of each of the two users illustrated in FIG. 22C is within a predetermined distance (for example, 50 cm) from the distance measuring sensor of the other user. In a case where a condition related to each of the inertial sensor data, the proximity sensor data, and the distance measuring sensor data is satisfied, the data processing unit 132C may determine that two users are running in parallel. Note that these conditions may be instantaneous conditions, or continuation for a predetermined period of time (for example, 5 minutes or the like) may be incorporated as a condition.

In the above description, a description has been given of an example in which an action is recognized in a case where all of the conditions related to the inertial sensor data, the proximity sensor data, and the distance measuring sensor data are satisfied. However, all of these conditions may not be satisfied. For example, an action may be recognized in a case where the conditions related to the inertial sensor data and the distance measuring sensor data are satisfied, regardless of whether or not the condition related to the proximity sensor data is satisfied.

A recognition result of each of an action of holding hands, an action of running in parallel, and an action of shaking hands may be used in various scenes. For example, a place where walking hand in hand is performed during a family's going-out or lovers' dating is recorded as a history, and memories can be recalled by referring to the history later.

In addition, it is possible to notice a difference in running performance between a parallel running person and a parallel running partner by recording the parallel running partner together with running data of the parallel running person and comparing the running data of the parallel running person and running data of the parallel running partner with each other. In addition, handshaking at the start of a conversation is recognized, and thus it is possible to automatically start recording of a minutes system immediately after recognizing the handshaking.

Action recognition related to an interaction has been described above.

4. Hardware Configuration Example

Figure 24:
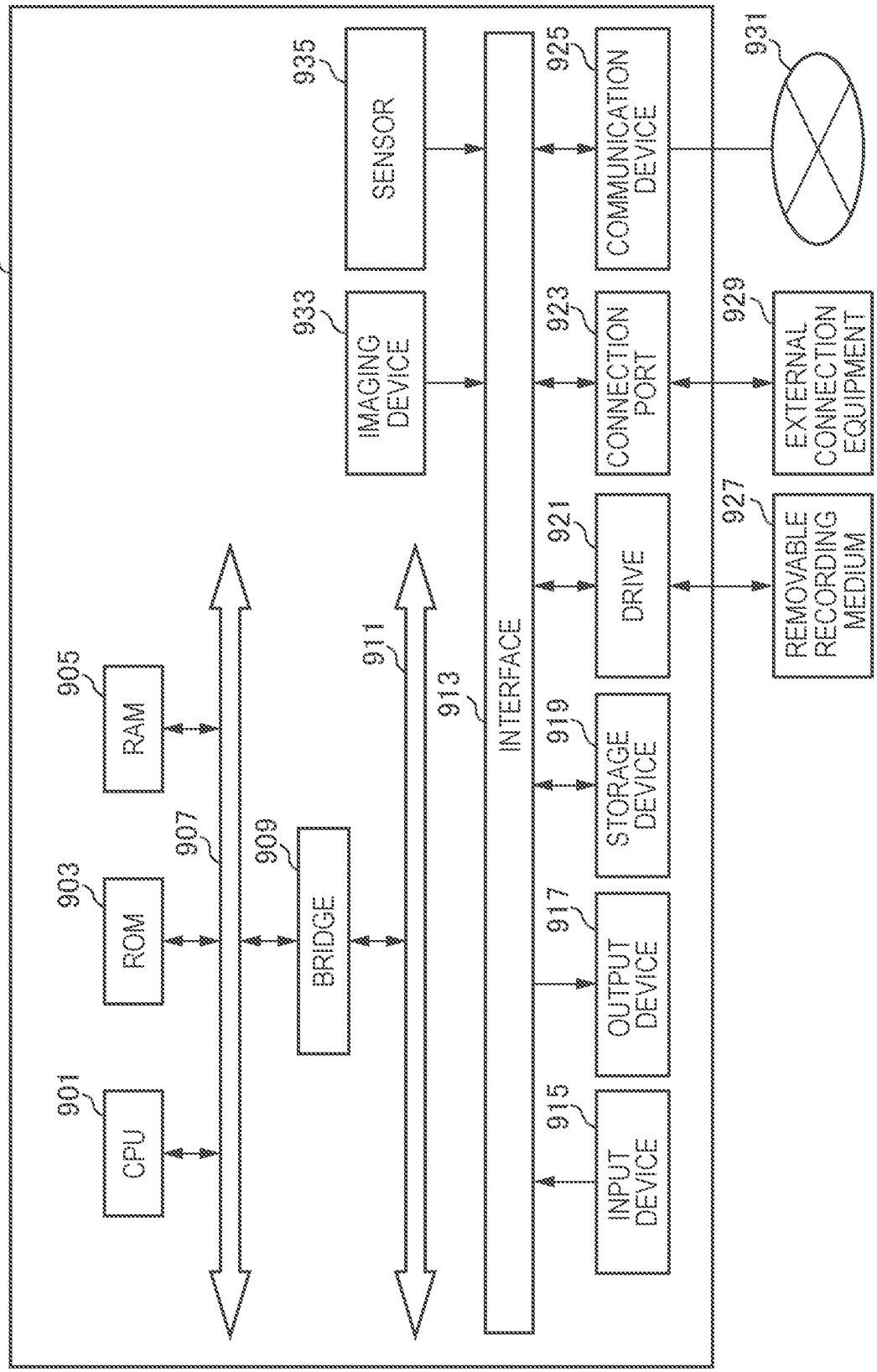
FIG. 24 is a block diagram illustrating a hardware configuration example of an information processing device.

Next, with reference to FIG. 24, a hardware configuration of the information processing device 10 according to the embodiment of the present disclosure will be described. FIG. 24 is a block diagram illustrating the hardware configuration example of the information processing device 10 according to the embodiment of the present disclosure.

As illustrated in FIG. 24, the information processing device 10 includes a central processing unit (CPU) 901, read only memory (ROM) 903, and random access memory (RAM) 905. In addition, the information processing device 10 may include a host bus 907, a bridge 909, an external bus 911, an interface 913, an input device 915, an output device 917, a storage device 919, a drive 921, a connection port 923, and a communication device 925. Moreover, the information processing device 10 may include an imaging device 933 and a sensor 935, as necessary. The information processing device 10 may include a processing circuit such as a digital signal processor (DSP) or an application specific integrated circuit (ASIC), alternatively or in addition to the CPU 901.

The CPU 901 serves as an arithmetic processing device and a control device, and controls the overall operation or a part of the operation of the information processing device 10 according to various programs recorded in the ROM 903, the RAM 905, the storage device 919, or a removable recording medium 927. The ROM 903 stores programs, operation parameters, and the like used by the CPU 901. The RAM 905 temporarily stores programs used when the CPU 901 is executed, and parameters that change as appropriate when executing such programs. The CPU 901, the ROM 903, and the RAM 905 are connected with each other via the host bus 907 configured from an internal bus such as a CPU bus. In addition, the host bus 907 is connected to the external bus 911 such as a Peripheral Component Interconnect/Interface (PCI) bus via the bridge 909.

The input device 915 is a device operated by a user such as a mouse, a keyboard, a touchscreen, a button, a switch, and a lever. The input device 915 may include a microphone configured to detect voice of users. The input device 915 may be a remote control device that uses, for example, infrared radiation and another type of radio waves. Alternatively, the input device 915 may be external connection equipment 929 such as a mobile phone that corresponds to an operation of the information processing device 10. The input device 915 includes an input control circuit that generates input signals on the basis of information which is input by a user to output the generated input signals to the CPU 901. A user inputs various types of data and indicates a processing operation to the information processing device 10 by operating the input device 915. In addition, the imaging device 933 (to be described later) may function as the input device by capturing an image of movement of hands of a user or capturing a finger of a user. In this case, a pointing position may be decided in accordance with the movement of the hands or a direction of the finger.

The output device 917 includes a device that can visually or audibly report acquired information to a user. The output device 917 may be, for example, a display device such as a liquid crystal display (LCD), a plasma display panel (PDP), an organic electro-luminescence (EL) display, a projector, or a hologram display device, a sound output device such as a speaker or a headphone, or a printer. The output device 917 outputs a result obtained through a process performed by the information processing device 10, in the form of text or video such as an image, or sounds such as voice and audio sounds. In addition, the output device 917 may include a light or the like to light the surroundings.

The storage device 919 is a device for data storage that is an example of the storage unit of the information processing device 10. The storage device 919 includes, for example, a magnetic storage unit device such as a hard disk drive (HDD), a semiconductor storage device, an optical storage device, or a magneto-optical storage device. The storage device 919 stores therein various data and programs executed by the CPU 901, and various data acquired from an outside.

The drive 921 is a reader/writer for the removable recording medium 927 such as a magnetic disk, an optical disc, a magneto-optical disk, and a semiconductor memory, and built in or externally attached to the information processing device 10. The drive 921 reads out information recorded on the mounted removable recording medium 927, and outputs the information to the RAM 905. The drive 921 writes the record into the mounted removable recording medium 927.

The connection port 923 is a port used to directly connect equipment to the information processing device 10. The connection port 923 may be a USB (Universal Serial Bus) port, an IEEE1394 port, and a Small Computer System Interface (SCSI) port, or the like. In addition, the connection port 923 may be an RS-232C port, an optical audio terminal, an HDMI (registered trademark) (High-Definition Multimedia Interface) port, and so on. The connection of the external connection equipment 929 to the connection port 923 makes it possible to exchange various kinds of data between the information processing device 10 and the external connection equipment 929.

The communication device 925 is a communication interface including, for example, a communication device for connection to the communication network 931. The communication device 925 may be, for example, a wired or wireless local area network (LAN), Bluetooth (registered trademark), or a communication card for a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transmits signals to and receives signals from another communication device by using a predetermined protocol such as TCP/IP. The communication network 931 to which the communication device 925 connects is a network established through wired or wireless connection. The communication network 931 is, for example, the Internet, a home LAN, infrared communication, radio communication, or satellite communication.

The imaging device 933 is a device that captures images of a real space by using an image sensor such as a charge coupled device (CCD) or a complementary metal oxide semiconductor (CMOS), and various members such as a lens for controlling image formation of a subject image onto the image sensor, and generates the captured images. The imaging device 933 may capture a still image or a moving image.

The sensor 935 is various sensors such as a ranging sensor, an acceleration sensor, a gyro sensor, a geomagnetic sensor, a vibration sensor, an optical sensor, and a sound sensor. The sensor 935 acquires information regarding a state of the information processing device 10 such as a posture of a housing of the information processing device 10, and information regarding an environment surrounding the information processing device 10 such as luminous intensity and noise around the information processing device 10. The sensor 935 may include a global positioning system (GPS) sensor that receives GPS signals to measure latitude, longitude, and altitude of the device.

5. Conclusion

As described above, according to the embodiments of the present disclosure, there is provided the information processing device 10A including the sensor control unit 131A acquiring distance measuring sensor data detected by the plurality of distance measuring sensors 112, the data processing unit 132A obtaining action recognition results of one or a plurality of users by analyzing the distance measuring sensor data, and the output control unit 133A controlling output according to the action recognition results. According to such a configuration, it is possible to improve the accuracy of recognition of the user's action which has been difficult to improve only using a detection result obtained by an inertial sensor.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the position of each component is not particularly limited as long as the operation of the information processing device 10 described above is realized. As a specific example, as described above, some or all of the blocks other than the detection unit 110 may be present outside the information processing device 10. That is, some or all of the blocks other than the detection unit 110 may be present in a mobile terminal (for example, a smartphone or the like) or the like, or may be present in a server or the like. The information processing device 10 may be achieved by so-called cloud computing. In addition, the detection 110 may be present outside the information processing device 10. For example, the inertial sensor 111 may be mounted on a smartphone different from the information processing device 10, or may be present at a predetermined position (for example, the user's waist or the like) outside the information processing device 10.

In addition, it is also possible to create a computer program for causing hardware such as CPU, ROM, and RAM, which are embedded in a computer, to execute functions equivalent to the functions of the control unit 130. Moreover, it may be possible to provide a computer-readable recording medium having the program recorded thereon.

Further, the effects described in this specification are merely illustrative or exemplified effects, and are not limitative. That is, with or in the place of the above effects, the technique according to the present disclosure may achieve other effects that are clear to those skilled in the art from the description of this specification.

Additionally, the present technology may also be configured as below.

(1)

An information processing device including:

a sensor control unit configured to acquire distance measuring sensor data detected by a plurality of distance measuring sensors;

a data processing unit configured to obtain action recognition results of one or a plurality of users by analyzing the distance measuring sensor data; and an output control unit configured to control output according to the action recognition result.

(2)

The information processing device according to (1), in which the data processing unit calculates a first distance between a first distance measuring sensor and a second distance measuring sensor among the plurality of distance measuring sensors to obtain the action recognition result of the user on a basis of the first distance.

(3)

The information processing device according to (2), in which the data processing unit calculates a second distance between a third distance measuring sensor and a fourth distance measuring sensor among the plurality of distance measuring sensors to obtain the action recognition result of the user on a basis of the first distance and the second distance.

(4)

The information processing device according to (1), in which the sensor control unit acquires inertial sensor data detected by one or a plurality of inertial sensors, and the data processing unit obtains the action recognition result of the user by analyzing the distance measuring sensor data and the inertial sensor data.

(5)

The information processing device according to (4), in which in a case where the inertial sensor data satisfies a predetermined condition, the data processing unit obtains the action recognition result of the user on a basis of a distance between a first distance measuring sensor and a second distance measuring sensor among the plurality of distance measuring sensors.

(6)

The information processing device according to (4), in which in a case where the inertial sensor data satisfies a predetermined condition, the data processing unit obtains the action recognition result of the user on a basis of a distance between a first distance measuring sensor and each of a second distance measuring sensor, a third distance measuring sensor, and a fourth distance measuring sensor among the plurality of distance measuring sensors.

(7)

The information processing device according to (4), in which in a case where the inertial sensor data satisfies a predetermined condition, the data processing unit obtains the action recognition result of the user on a basis of a distance between a first distance measuring sensor and a second distance measuring sensor among the plurality of distance measuring sensors, and the inertial sensor data.

(8)

The information processing device according to (4), in which the sensor control unit acquires proximity sensor data detected by a plurality of proximity sensors, and the data processing unit obtains the action recognition result of the user by analyzing the distance measuring sensor data, the inertial sensor data, and the proximity sensor data.

(9)

The information processing device according to any one of (1) to (8), in which the output control unit controls output according to the action recognition result and an ideal action determined in advance.

(10)

The information processing device according to (1), in which the plurality of distance measuring sensors are attached to one user.

(11)

The information processing device according to (10), in which a first distance measuring sensor, among the plurality of distance measuring sensors, is attached to the user's right foot, a second distance measuring sensor, among the plurality of distance measuring sensors, is attached to the user's left foot, and in a case where inertial sensor data satisfies a predetermined condition, the data processing unit acquires a distance between the first distance measuring sensor and the second distance measuring sensor, as the user's step size.

(12)

The information processing device according to (10), in which a first distance measuring sensor, among the plurality of distance measuring sensors, is attached to the user's hand, wrist, or arm, a second distance measuring sensor, a third distance measuring sensor, and a fourth distance measuring sensor, among the plurality of distance measuring sensors, are attached to the user's body, and in a case where inertial sensor data satisfies a predetermined condition, the data processing unit estimates a track of a golf club swung by the user, on a basis of a distance between the first distance measuring sensor and each of the second distance measuring sensor, the third distance measuring sensor, and the fourth distance measuring sensor.

(13)

The information processing device according to (10), in which a first distance measuring sensor, among the plurality of distance measuring sensors, is attached to the user's hand, wrist, or arm, a second distance measuring sensor, among the plurality of distance measuring sensors, is attached to the user's foot or a board, and in a case where inertial sensor data satisfies a predetermined condition, the data processing unit determines a trick of snowboarding on a basis of a distance between the first distance measuring sensor and the second distance measuring sensor, and the inertial sensor data.

(14)

The information processing device according to (10), in which a first distance measuring sensor, among the plurality of distance measuring sensors, is attached to the user's foot, a second distance measuring sensor, among the plurality of distance measuring sensors, is attached to the user's body, and in a case where inertial sensor data satisfies a predetermined condition, the data processing unit determines a kick performance of a ball on a basis of a distance between the first distance measuring sensor and the second distance measuring sensor.

(15)

The information processing device according to (1), in which the plurality of distance measuring sensors are attached to a plurality of users.

(16)

The information processing device according to (15), in which a first distance measuring sensor, among the plurality of distance measuring sensors, is attached to a first user, a second distance measuring sensor, among the plurality of distance measuring sensors, is attached to a second user, and in a case where inertial sensor data satisfies a predetermined first condition and a distance between the first distance measuring sensor and the second distance measuring sensor satisfies a predetermined second condition, the data processing unit obtains an action according to the first condition and the second condition as the action recognition result.

(17)

The information processing device according to (1), in which the plurality of distance measuring sensors are attached to the user and an object related to the user's action.

(18)

The information processing device according to (17),
in which a first distance measuring sensor, among the plurality of distance measuring sensors, is attached to the user's foot,
a second distance measuring sensor, among the plurality of distance measuring sensors, is attached to a ball, and
in a case where inertial sensor data satisfies a predetermined condition, the data processing unit determines a speed of the ball on a basis of a distance between the first distance measuring sensor and the second distance measuring sensor.

(19)

An information processing method including:
a sensor control unit configured to acquire distance measuring sensor data detected by a plurality of distance measuring sensors;
a data processing unit configured to obtain action recognition results of one or a plurality of users by analyzing the distance measuring sensor data; and
an output control unit configured to control output according to the action recognition result by a processor.

(20)

A program causing a computer to function as an information processing device including:
a sensor control unit configured to acquire distance measuring sensor data detected by a plurality of distance measuring sensors;
a data processing unit configured to obtain action recognition results of one or a plurality of users by analyzing the distance measuring sensor data; and
an output control unit configured to control output according to the action recognition result.

REFERENCE SIGNS LIST 10 (10A to 10C) information processing device
110 (110A to 110C) detection unit
111 inertial sensor
112 distance measuring sensor
113 proximity sensor
120 operation unit
130A to 130C control unit
131A to 131C sensor control unit
132A to 132C data processing unit
133A to 133C output control unit
140 storage unit
150 output unit

The invention claimed is:

1. An information processing device, comprising:
a plurality of distance measuring sensors configured to detect distance measuring sensor data; and
a processor configured to:
acquire the detected distance measuring sensor data;
calculate, based on the acquired distance measuring sensor data, a first distance between a first distance measuring sensor of the plurality of distance measuring sensors and a second distance measuring sensor of the plurality of distance measuring sensors;
obtain an action recognition result of a user based on a period of time in which the calculated first distance is constant,
wherein the period of time is greater than a specific period of time;
calculate a score as a degree of similarity between the action recognition result and a specific action of the user; and
control output of the calculated score.

2. The information processing device according to claim 1, wherein the processor is further configured to:
calculate a second distance between a third distance measuring sensor of the plurality of distance measuring sensors and a fourth distance measuring sensor of the plurality of distance measuring sensors; and
obtain the action recognition result of the user based on the calculated first distance and the calculated second distance.

3. The information processing device according to claim 1, further comprising at least one inertial sensor configured to detect inertial sensor data,
wherein the processor is further configured to:
acquire the detected inertial sensor data;
analyze the acquired inertial sensor data; and
obtain the action recognition result of the user based on the analyzed inertial sensor data.

4. The information processing device according to claim 3, wherein in a case where the acquired inertial sensor data satisfies a specific condition, the processor is further configured to obtain the action recognition result of the user based on a second distance between the first distance measuring sensor of the plurality of distance measuring sensors and a third distance measuring sensor of the plurality of distance measuring sensors.

5. The information processing device according to claim 3, wherein in a case where the acquired inertial sensor data satisfies a specific condition, the processor is further configured to obtain the action recognition result of the user based on a second distance between the first distance measuring sensor of the plurality of distance measuring sensors and each of the second distance measuring sensor of the plurality of distance measuring sensors, a third distance measuring sensor of the plurality of distance measuring sensors, and a fourth distance measuring sensor of the plurality of distance measuring sensors.

6. The information processing device according to claim 3, wherein the processor is further configured to obtain the action recognition result of the user based on a second distance between the first distance measuring sensor of the plurality of distance measuring sensors and a third distance measuring sensor of the plurality of distance measuring sensors, and the acquired inertial sensor data.

7. The information processing device according to claim 3, further comprising a plurality of proximity sensors configured to detect proximity sensor data,
wherein the processor is further configured to:
acquire the detected proximity sensor data;
analyze the acquired proximity sensor data; and
obtain the action recognition result of the user based on the analyzed inertial sensor data and the analyzed proximity sensor data.

8. The information processing device according to claim 1, further comprising at least one inertial sensor configured to detect inertial sensor data,
wherein the plurality of distance measuring sensors is attachable to the user.

9. The information processing device according to claim 8, wherein
the first distance measuring sensor of the plurality of distance measuring sensors is attachable to a right foot of the user,
a third distance measuring sensor of the plurality of distance measuring sensors is attachable to a left foot of the user, and
in a case where the inertial sensor data satisfies a specific condition, the processor is further configured to acquire a second distance between the first distance measuring sensor and the third distance measuring sensor, as a step size of the user.

10. The information processing device according to claim 8, wherein the first distance measuring sensor of the plurality of distance measuring sensors is attachable to one of a hand of the user, a wrist of the user, or an arm of the user, the second distance measuring sensor of the plurality of distance measuring sensors, a third distance measuring sensor of the plurality of distance measuring sensors, and a fourth distance measuring sensor of the plurality of distance measuring sensors are attachable to a body of the user, in a case where the inertial sensor data satisfies a specific condition, the processor is further configured to estimate a track of a golf club swung by the user, and the estimation of the track of the golf club is based on a second distance between the first distance measuring sensor and each of the second distance measuring sensor, the third distance measuring sensor, and the fourth distance measuring sensor.

11. The information processing device according to claim 8, wherein the first distance measuring sensor of the plurality of distance measuring sensors is attachable to one of a hand of the user, a wrist of the user, or an arm of the user, a third distance measuring sensor of the plurality of distance measuring sensors is attachable to one of a foot of the user or a board associated with the user, and in a case where the inertial sensor data satisfies a specific condition, the processor is further configured to determine a trick of snowboarding based on a second distance between the first distance measuring sensor and the third distance measuring sensor.

12. The information processing device according to claim 8, wherein the first distance measuring sensor of the plurality of distance measuring sensors is attachable to a foot of the user, a third distance measuring sensor of the plurality of distance measuring sensors is attachable to a body of the user, and in a case where the inertial sensor data satisfies a specific condition, the processor is further configured to estimate a kick performance of a ball based on a second distance between the first distance measuring sensor and the third distance measuring sensor.

13. The information processing device according to claim 1, further comprising at least one inertial sensor configured to detect inertial sensor data, wherein the plurality of distance measuring sensors is attachable to a plurality of users.

14. The information processing device according to claim 13, wherein the first distance measuring sensor of the plurality of distance measuring sensors is attachable to a first user of the plurality of users, a third distance measuring sensor of the plurality of distance measuring sensors is attachable to a second user of the plurality of users, and in a case where the inertial sensor data satisfies a first condition and a second distance between the first distance measuring sensor and the third distance measuring sensor satisfies a second condition, the processor is further configured to obtain an action as the action recognition result based on the first condition and the second condition.

15. The information processing device according to claim 1, wherein the plurality of distance measuring sensors is attachable to the user and an object related to the user.

16. The information processing device according to claim 15, further comprising at least one inertial sensor configured to detect inertial sensor data, wherein the first distance measuring sensor of the plurality of distance measuring sensors is attachable to a foot of the user, a third distance measuring sensor of the plurality of distance measuring sensors is attachable to a ball, and in a case where the inertial sensor data satisfies a specific condition, the processor is further configured to determine a speed of the ball based on a second distance between the first distance measuring sensor and the third distance measuring sensor.

17. An information processing method, comprising:

detecting, by a plurality of distance measuring sensors, distance measuring sensor data;

acquiring, by a processor, the detected distance measuring sensor data;

calculating, by the processor based on the acquired distance measuring sensor data, a distance between a first distance measuring sensor of the plurality of distance measuring sensors and a second distance measuring sensor of the plurality of distance measuring sensors;

obtaining, by the processor, an action recognition result of a user based on a period of time in which the calculated distance is constant, wherein the period of time is greater than a specific period of time;

calculating, by the processor, a score as a degree of similarity between the action recognition result and a specific action of the user; and controlling, by the processor, output of the calculated score.

18. A non-transitory computer-readable medium having stored thereon computer-executable instructions which, when executed by a processor, cause the processor to execute operations, the operations comprising:

acquiring distance measuring sensor data detected by a plurality of distance measuring sensors;

calculating, based on the acquired distance measuring sensor data, a distance between a first distance measuring sensor of the plurality of distance measuring sensors and a second distance measuring sensor of the plurality of distance measuring sensors;

obtaining an action recognition result of a user based on a period of time in which the calculated distance is constant, wherein the period of time is greater than a specific period of time;

calculating a score as a degree of similarity between the action recognition result and a specific action of the user; and controlling output of the calculated score.

* * * * *